US010885216B2

(12) United States Patent
Hahn et al.

(10) Patent No.: US 10,885,216 B2
(45) Date of Patent: Jan. 5, 2021

(54) SECURE SUBSTRING SEARCH TO FILTER ENCRYPTED DATA

(71) Applicant: SAP SE, Walldorf (DE)

(72) Inventors: Florian Hahn, Karlsruhe (DE); Nicolas Loza, Karlsruhe (DE); Florian Kerschbaum, Karlsruhe (DE)

(73) Assignee: SAP SE, Walldorf (DE)

( * ) Notice: Subject to any disclaimer, the term of this patent is extended or adjusted under 35 U.S.C. 154(b) by 285 days.

(21) Appl. No.: 15/874,754

(22) Filed: Jan. 18, 2018

(65) Prior Publication Data

US 2019/0220620 A1 Jul. 18, 2019

(51) Int. Cl.
*G06F 21/62* (2013.01)
*G06F 21/60* (2013.01)
(Continued)

(52) U.S. Cl.
CPC ...... *G06F 21/6227* (2013.01); *G06F 16/3331* (2019.01); *G06F 16/90344* (2019.01);
(Continued)

(58) Field of Classification Search
CPC ............ G06F 21/6227; G06F 16/3331; G06F 16/90344; G06F 21/606; G06F 21/602;
(Continued)

(56) References Cited

U.S. PATENT DOCUMENTS 8,429,421 B2 4/2013 Chase et al.
2010/0146299 A1* 6/2010 Swaminathan ..... G06F 21/6218 713/189

(Continued)

FOREIGN PATENT DOCUMENTS

EP 3151461 A1 4/2017

OTHER PUBLICATIONS

Matteo Maffei, On the security of frequency-hiding order-preserving encryption (Year: 2018).*

(Continued)

*Primary Examiner* — Matthew Smithers
*Assistant Examiner* — Mirza Israr Javed
(74) *Attorney, Agent, or Firm* — Fountainhead Law Group P.C.

(57) ABSTRACT

Secure substring searching on encrypted data may involve a first preprocessing comprising fragmenting a plaintext string slated for remote secure storage, in a plurality of overlapping plaintext substrings. A second preprocessing encrypts these substrings into ciphertexts (e.g., utilizing Frequency-Hiding Order Preserving Encryption) further including position information of the substring. A search index and a secret state result from the first and second preprocessing. The ciphertexts and search index are outsourced to a database within an unsecure server. An engine within the server determines candidate ciphertexts matching a query request received from a secure client. The engine returns ciphertexts to the client for decryption according to the secret state. Preprocessing may be delegated to a third party for outsourcing search index/ciphertexts to the server, and the secret state to the client. Filtering of candidate ciphertexts on the server-side, can eliminate false positives and reduce the volume of communication with remote clients.

17 Claims, 15 Drawing Sheets

(51) Int. Cl.
*H04L 9/00* (2006.01)
*G06F 16/903* (2019.01)
*H04L 29/06* (2006.01)
*G06F 16/33* (2019.01)

(52) U.S. Cl.
CPC .......... *G06F 21/602* (2013.01); *G06F 21/606* (2013.01); *H04L 9/008* (2013.01); *H04L 63/0428* (2013.01); *G06F 21/6218* (2013.01)

(58) Field of Classification Search
CPC .. G06F 21/6218; H04L 63/0428; H04L 9/008
See application file for complete search history.

(56) References Cited

U.S. PATENT DOCUMENTS

| | | | | |
|---|---|---|---|---|
| 2012/0159180 | A1* | 6/2012 | Chase | G06F 21/6227 713/183 |
| 2017/0078251 | A1* | 3/2017 | Grubbs | H04L 63/0471 |
| 2018/0019866 | A1* | 1/2018 | Kerschbaum | H04L 9/0618 |

OTHER PUBLICATIONS

Ce Yang, Range queries on two column data (Year: 2017).*
Hong Zhu, Executing query over encrypted character strings in database (Year: 2006).*
Florian Kerschbaum, Frequency-hiding order-preserving encryption (Year: 2015).*
Rakesh Agrawal, et al, "Order Preserving Encryption for Numeric Data", SIGMOD 2004, Jun. 13-18, 2004, 12 pages,Paris, France.
Mihir Bellare, et al."Deterministic and Efficiently Searchable Encryption", CRYPTO 2007, LNCS 4622, pp. 535-552, 2007, Aug. 19-23, 2007, 18 pages, Santa Barbara, California, USA.
Mihir Bellare, et al. "Deterministic Encryption Definitional Equivalence" D. Wagner (Ed.): CRYPTO 2008, LNCS 5157, pp. 360-378, 2008, 19 pages, Aug. 17-21, 2008. Santa Barbara, California, USA.
Alexandra Boldyreva, et al.,"Order-Preserving Symmetric Encryption" A. Joux (Ed.): EUROCRYPT 2009, LNCS 5479, pp. 224-241, Apr. 26-30 2009, 18 pages, Cologne (German spelling: Köln).
Alexandra Boldyreva, et al.,"Order-Preserving Encryption Revisited" P. Rogaway (Ed.): CRYPTO 2011, LNCS 6841, pp. 578-595, Aug. 14-18 2011,18 pages, Santa Barbara, CA, USA.
Dan Boneh, et al., "Semantically Secure Order-Revealing Encryption: Multi-Input Functional Encryption Without Obfuscation", EUROCRYPT 2015 pp. 563-594, 2014, 34 pages.
Dan Boner, et al., "Conjunctive, Subset, and Range Queries on Encrypted Data" S.P. Vadhan (Ed.): TCC 2007, LNCS 4392, pp. 535-554, Feb. 21-24, 2007, 20 pages, Amsterdam, The Netherlands.
David Cash, et al., "Highly-Scalable Searchable Symmetric Encryption with Support for Boolean Queries" Crypto'2013, Aug. 18-22, 2013, 45 pages, University of California, Santa Barbara, CA USA.
Melissa Chase, et al., "Substring-Searchable Symmetric Encryption", Jun. 18, 2015, 28 pages, Microsoft Research & MIT Lincoln Laboratory.
Nathan Chenette, et al., "Practical Order-Revealing Encryption with Limited Leakage" Apr. 26-30, 2015, 27 pages, Sofia, Bulgaria.
Dan Boneh, et al."Conjunctive, Subset, and Range Queries on Encrypted Data", S.P. Vadhan (Ed.): TCC 2007, LNCS 4392, pp. 535-554, Feb. 21-24, 2007, 20 pages, Amsterdam, The Netherlands.
Reza Curtmola, et al, "Searchable Symmetric Encryption: Improved Definitions and Efficient Constructions", CCS'06, Oct. 30-Nov. 3, 2006, 10 pages, Alexandria, Virginia, USA.
Mihir Bellare, et al, "Deterministic and Efficiently Searchable Encryption", CRYPTO '07 Proceedings. Lecture Notes in Computer Science, vol. 4622, pp. 535-552, A. Menezes ed., Springer, 2007, Aug. 19-23, 2007, 43 pages, Santa Barbara, California, USA.
Seny Kamara, et al, "Dynamic Searchable Symmetric Encryption" Oct. 16-18, 2012, 24 pages, Raleigh, NC, USA.
Sky Faber, et al, "Rich Queries on Encrypted Data: Beyond Exact Matches"published at ESORICS 2015, Sep. 23-25, 2015, 31 pages, Vienna, Austria.
Eu-Jin Goh, et al, "Secure Indexes" Mar. 16, 2004, 18 pages, Stanford University, CA, USA.
Paul Grubbs, et al, "Leakage-Abuse Attacks against Order-Revealing Encryption", IEEE , May 22-26, 2017, 16 pages, San Jose, CA, USA.
Hakan Hacigumus, et al., "Providing Database as a Service", IEEE , Feb. 26-Mar. 1, 2002, 10 pages, San Jose, CA, USA.
Hakan Hacigumus, et al., "Executing SQL over Encrypted Data in the Database-Service-Provider Model", 2002 ACM SIGMOD International Conference, Jun. 4-6, 2002, 12 pages, Madison, Wisconsin, USA.
Florian Hahn, et al., "Poly-Logarithmic Range Queries on Encrypted Data with Small Leakage", ACM 2016 Article, Oct. 28, 2016, 12 pges, Vienna, Austria.
David Cash, et al., "Highly-Scalable Searchable Symmetric Encryption with Support for Boolean Queries", CRYPTO 2013, Aug. 18-22, 2013, 45 pages, Santa Barbara, California, USA.
Seny Kamara, et al., "Dynamic Searchable Symmetric Encryption"CCS'12, Oct. 16-18, 2012, 12 pages. Raleigh, North Carolina, USA.
Florian Kerschbaum, et al., "Optimal Average-Complexity Ideal-Security Order-Preserving Encryption" CCS'14, Nov. 3-7, 2014, 12 pages, Scottsdale, Arizona, USA.
Florian Kerschbaum, "Frequency-Hiding Order-Preserving Encryption" CCS'15, Oct. 12-16, 12 pages, 2015, Denver, Colorado, USA.
Lewi Wu, et al., "Order-Revealing Encryption: New Constructions, Applications, and Lower Bounds" ACM CCS 2016, Oct. 25-27, 2016, 44 pages, Hofburg Palace, Vienna, Austria.
Yanbin Lu, "Privacy-Preserving Logarithmic-time Search on Encrypted Data in Cloud" NDSS Symposium 2012, Feb. 6, 2012, 17 pages, San Diego, CA, USA.
Charalampos Mavroforakis, et al., "Modular Order-Preserving Encryption, Revisited" 2015 ACM 978-1-4503-2758—Sep. 15, 2005, SIGMOD'15, May 31-Jun. 4, 2015, 14 pages, Melbourne, Victoria, Australia.
Muhammad Naveed, et al., "Dynamic Searchable Encryption via Blind Storage", IEEE, May 18-21, 2014, 16 pages, San Jose, CA, USA.
Muhammad Naveed, et al., "Inference Attacks on Property-Preserving Encrypted Databases" CCS'15, Oct. 12-16, 2015, 13 pages, Denver, CO, USA.
Raluca Ada Popa, et al., "CryptDB: Protecting Confidentiality with Encrypted Query Processing" SOSP '11, Oct. 23-26, 2011, 16 pages, Cascais, Portugal.
Raluca Ada Popa, et al., "An Ideal-Security Protocol for Order-Preserving Encoding", IEEE, May 19-22, 2013, 15 pages, Berkeley, CA, USA.
Daniel Roche, et al., "POPE: Partial Order-Preserving Encoding", EUROCRYPT 2015, Part II, vol. 9057 of LNCS, pp. 563-594, 32 pages, Annapolis, MD, USA.
Elaine Shi, et al., "Multi-Dimensional Range Query over Encrypted Data", CMU-CS-06-135, Mar. 2007, 48 pages, School of Computer Science Carnegie Mellon University Pittsburgh, PA 15213.
Dawn Xiaodong Song, et al., "Practical Techniques for Searches on Encrypted Data" IEEE, 12 pages, May 14-17, 2000.
Emil Stefanov, et al., "Practical Dynamic Searchable Encryption with Small Leakage" NDSS '14, Feb. 23-26, 2014, 15 pages, San Diego, CA, USA.
Wang, et al. "Privacy-Preserving Ranked Multi-Keyworkd Fuzzy Search on Cloud Encrypted Data Supporting Range Query", Arabian Journal for Science and Engineering, Springer Berlin Heidelberg, Berlin, vol. 40, No. 8, Jun. 25, 2015, pp. 2375-2388.
Li, et al. "Fast and Scalable Range Query Processing With Strong Privacy Protection for Cloud Computing", IEEE/ACM Transactions on Networking, vol. 24, No. 4, Aug. 1, 2016, pp. 2305-2318.
European Search Report, Application No. 18184440.8, dated Jan. 4, 2019, 10 pages.

* cited by examiner

```
Protocol 1 : Encryption of one string
Data: A string s = s_1 ... s_l, k-gram length k, Secret Key sk
Result: @DB: search index I. @CL: secret state ST.
∀i ∈ {1, ..., n − k} g_i := s_i ... s_{i+k};
∀i ∈ {n − k + 1, ..., n} g_i := s_i ... s_n;
Define pos as Map< k-gram, List < Integer >> ;    /* Map
    each k-gram to its positions in s */
Define g as list containing all unique k-grams;
Sort g lexicographically;
Define ST as empty list;
Define o := 0 ;          /* current FHOPE ciphertext */
foreach kg_j ∈ g do
    define start_o = o;
    l ← shuffle(pos[kg_j]);
    foreach p ∈ l do
        c ← Enc(sk, p);
        I.add((o, c));
        o = o + 1;
    ρ^{kg_i} = (start_o, o − 1);
    ST.add(kg_i, ρ^{kg_i}); /* k-gram and FHOPE ciphertext
        range */
Return ST, I
```

FIG. 3

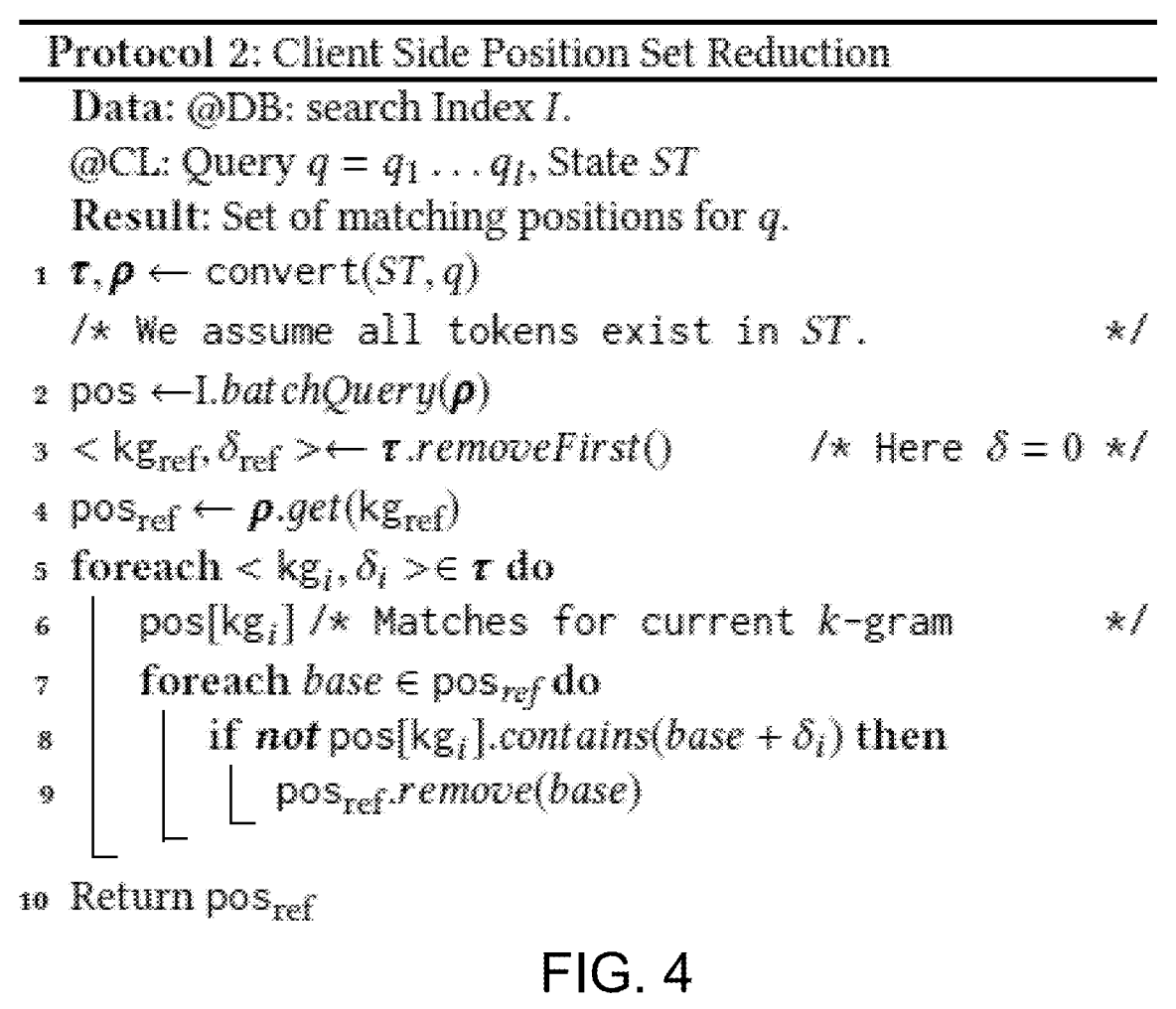

Protocol 2: Client Side Position Set Reduction

Data: @DB: search Index $I$.

@CL: Query $q = q_1 \ldots q_l$, State $ST$

Result: Set of matching positions for $q$.

$\boldsymbol{\tau}, \boldsymbol{\rho} \leftarrow \texttt{convert}(ST, q)$

`/* We assume all tokens exist in ST. */`

$\text{pos} \leftarrow \text{I}.batchQuery(\boldsymbol{\rho})$ $< \text{kg}_{\text{ref}}, \delta_{\text{ref}} > \leftarrow \boldsymbol{\tau}.removeFirst()$ `/* Here δ = 0 */`

$\text{pos}_{\text{ref}} \leftarrow \boldsymbol{\rho}.get(\text{kg}_{\text{ref}})$ foreach $< \text{kg}_i, \delta_i > \in \boldsymbol{\tau}$ do

$\text{pos}[\text{kg}_i]$ `/* Matches for current k-gram */` foreach $base \in \text{pos}_{ref}$ do if *not* $\text{pos}[\text{kg}_i].contains(base + \delta_i)$ then

$\text{pos}_{\text{ref}}.remove(base)$

Return $\text{pos}_{\text{ref}}$

FIG. 4

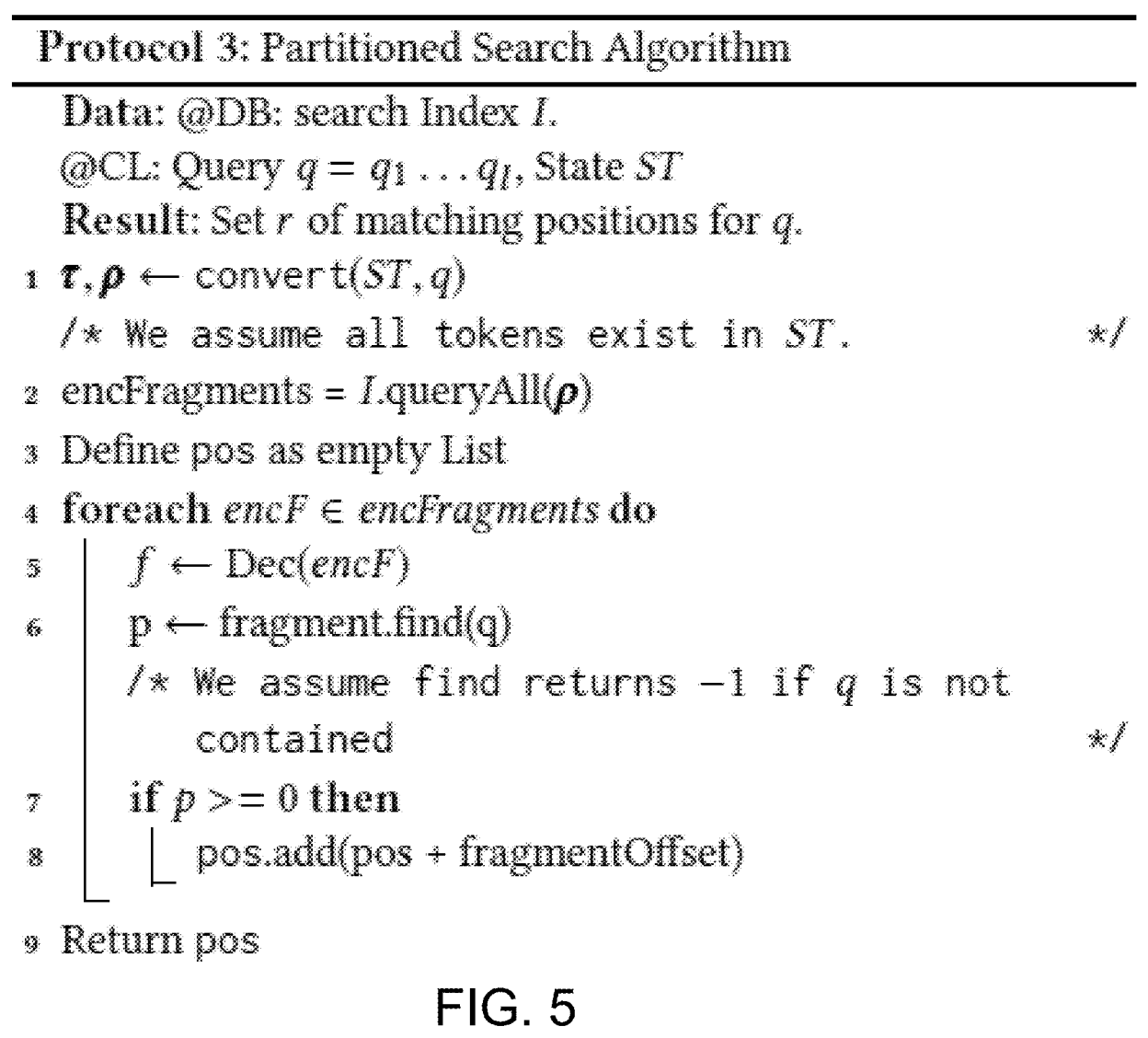

Protocol 3: Partitioned Search Algorithm

Data: @DB: search Index $I$.
@CL: Query $q = q_1 \ldots q_l$, State $ST$
Result: Set $r$ of matching positions for $q$.

$\tau, \rho \leftarrow$ convert$(ST, q)$
/* We assume all tokens exist in $ST$. */
encFragments = $I$.queryAll($\rho$)
Define pos as empty List
foreach $encF \in encFragments$ do
    $f \leftarrow$ Dec($encF$)
    p ← fragment.find(q)
    /* We assume find returns −1 if $q$ is not contained */
    if $p >= 0$ then
        pos.add(pos + fragmentOffset)
Return pos

FIG. 5

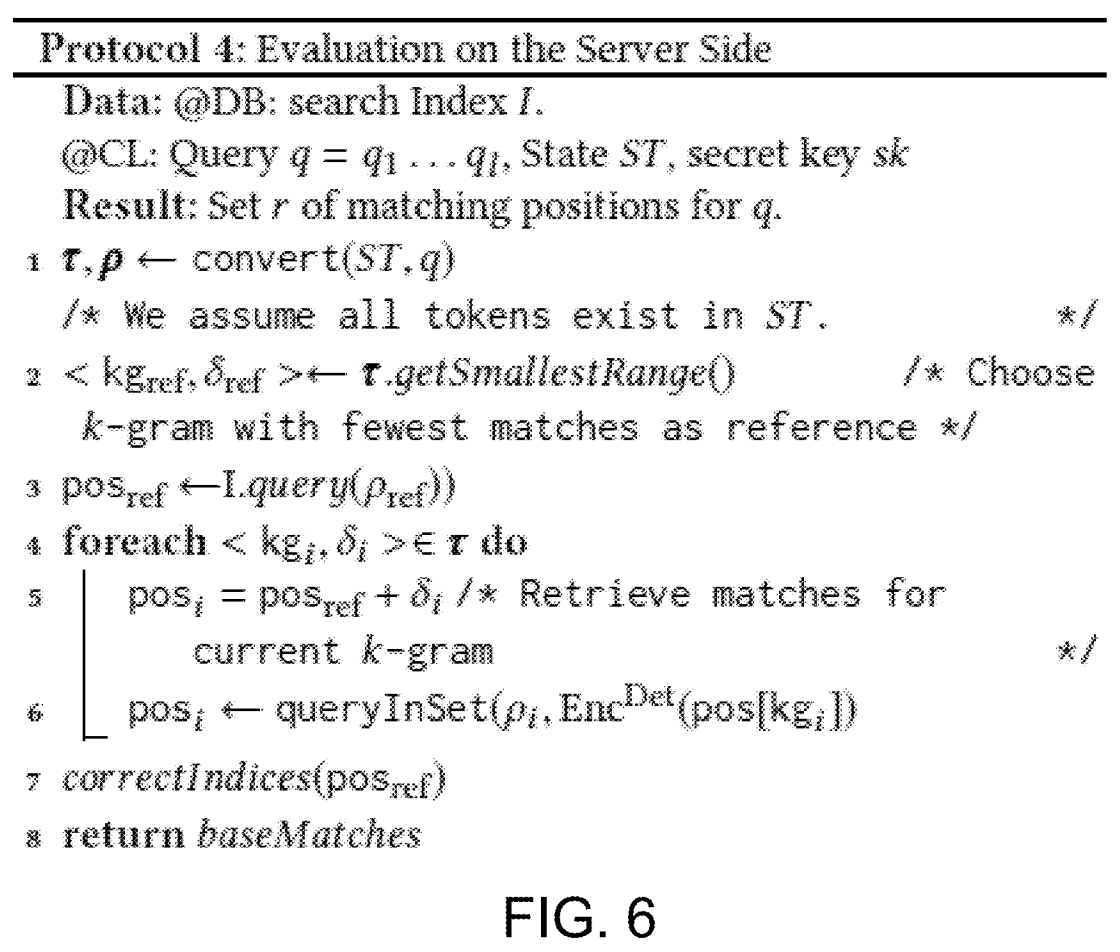

Protocol 4: Evaluation on the Server Side

Data: @DB: search Index $I$.

@CL: Query $q = q_1 \ldots q_l$, State $ST$, secret key $sk$

Result: Set $r$ of matching positions for $q$.

1 $\boldsymbol{\tau}, \boldsymbol{\rho} \leftarrow \texttt{convert}(ST, q)$

/* We assume all tokens exist in $ST$. */

2 $< \mathsf{kg}_{\mathrm{ref}}, \delta_{\mathrm{ref}} > \leftarrow \boldsymbol{\tau}.getSmallestRange()$ /* Choose $k$-gram with fewest matches as reference */

3 $\mathsf{pos}_{\mathrm{ref}} \leftarrow \mathrm{I}.query(\rho_{\mathrm{ref}}))$ 4 foreach $< \mathsf{kg}_i, \delta_i > \in \boldsymbol{\tau}$ do

5 $\mathsf{pos}_i = \mathsf{pos}_{\mathrm{ref}} + \delta_i$ /* Retrieve matches for current $k$-gram */

6 $\mathsf{pos}_i \leftarrow \texttt{queryInSet}(\rho_i, \mathrm{Enc}^{\mathrm{Det}}(\mathsf{pos}[\mathsf{kg}_i]))$ 7 $correctIndices(\mathsf{pos}_{\mathrm{ref}})$ 8 return $baseMatches$

FIG. 6

SECURE SUBSTRING SEARCH TO FILTER ENCRYPTED DATA

BACKGROUND

Unless otherwise indicated herein, the approaches described in this section are not prior art to the claims in this application and are not admitted to be prior art by inclusion in this section.

With the paradigm shift from on-premise software to cloud computing and cloud storage, new potential attackers need to be considered for security purposes. Thus not only external attackers, but also inside attackers such as malicious cloud administrators may potentially represent malicious actors.

Encrypted databases may address these trust issues with minimal computation overhead and small integration effort into existing database systems. While standard randomized encryption schemes such as AES offer semantic security, they render difficult or impossible any computation on this encrypted data.

However the ability to filter outsourced encrypted data directly within the cloud environment, remains highly desirable due to limited computational power and storage of mobile client devices (e.g., phones, tablets). The emergency of big data applications has only exacerbated this demand for the ability to filter outsourced data directly in encrypted form.

SUMMARY

Embodiments perform secure substring searching on encrypted data. In a first preprocessing, a plaintext string slated for remote secure storage is fragmented into a plurality of overlapping plaintext substrings. In a second preprocessing, these substrings are encrypted into ciphertexts (e.g., utilizing Frequency-Hiding Order Preserving Encryption—FHOPE) further including position information of the substring. A search index and a secret state result from the first and second preprocessing.

The ciphertexts and search index are then outsourced to a database within an unsecure server. An engine within the server determines those candidate ciphertexts matching a query request received from a secure client. The engine returns ciphertexts to the client for decryption according to the secret state.

According to some embodiments preprocessing may be performed by the client directly. Alternatively however, the preprocessing may be delegated to a third party service responsible for outsourcing the search index/ciphertexts to the server, and the secret state to the client.

The engine may be configured to perform filtering of the candidate ciphertexts on the server-side, in order to eliminate false positives and reduce communication with the remote client. Such approaches can involve deterministic encryption of the position information.

An embodiment of a computer-implemented method comprises an engine of a server receiving from a client, a search query. The engine references a search index stored in a database of the server together with a plurality of ciphertexts, to produce candidate ciphertexts meeting the search query. The engine communicates to the client at least one candidate ciphertext, wherein each of the plurality of ciphertexts comprise a fragment of a string encrypted according to an encryption scheme, and a position of the fragment within the string.

A non-transitory computer readable storage medium embodies a computer program for performing a method comprising an engine of a server receiving from a client, a search query. The engine references a search index stored in a database of the server together with a plurality of ciphertexts encrypted according to a frequency-hiding order-preserving encryption (FHOPE) scheme, to produce candidate ciphertexts meeting the search query. The engine communicates to the client at least one candidate ciphertext, wherein each of the plurality of ciphertexts comprise a fragment of a string encrypted according to an encryption scheme, and a position of the fragment within the string.

An embodiment of a computer system comprises one or more processors and a software program executable on said computer system. The software program is configured to cause an in-memory database engine to receive from a client, a search query, and to reference a search index stored in an in-memory database of the server together with a plurality of ciphertexts, to produce candidate ciphertexts meeting the search query. The software program is further configured to cause the in-memory database engine to communicate to the client at least one candidate ciphertext, wherein each of the plurality of ciphertexts comprise a fragment of a string encrypted according to an encryption scheme, and a position of the fragment within the string.

In certain embodiments the encryption scheme comprises an order-preserving encryption scheme.

In some embodiments the encryption scheme comprises a frequency-hiding order-preserving encryption (FHOPE) scheme.

Particular embodiments further comprise the engine filtering the candidate ciphertexts to produce the at least one candidate ciphertext.

According to various embodiments the filtering comprises performing a range query.

In some embodiments the position is encrypted according to a deterministic encryption scheme.

According to particular embodiments the database comprises an in-memory database, and the engine comprises an in-memory database engine.

Certain embodiments further comprise, prior to receiving the search query, the engine storing the search index outsourced from the client.

Some embodiments further comprise, prior to receiving the search query, the engine storing the search index received from a trusted third party other than the client.

The following detailed description and accompanying drawings provide a better understanding of the nature and advantages of embodiments.

BRIEF DESCRIPTION OF THE DRAWINGS

FIG. 3 shows a protocol for encryption of one string according to an example.

FIG. 4 shows a protocol for client side position set reduction according to an example.

FIG. 5 shows a protocol for partitioned search according to an example.

FIG. 6 shows a protocol for evaluation on the server side according to an example.

DETAILED DESCRIPTION

Described herein are methods and apparatuses performing secure substring search according to embodiments. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Accordingly, embodiments perform secure substring searching on encrypted data. In a first preprocessing, a plaintext string slated for remote secure storage is fragmented into a plurality of overlapping plaintext substrings. In a second preprocessing, these substrings are encrypted into ciphertexts (e.g., utilizing Frequency-Hiding Order Preserving Encryption—FHOPE), further including position information of the substring. A search index and a secret state result from the first and second preprocessing.

The ciphertexts and search index are then outsourced to a database within an unsecure server. An engine within the server determines candidate ciphertexts matching a query request received from a secure client. The engine returns ciphertexts to the client for decryption according to the secret state.

Preprocessing may be performed by the client directly. Alternatively, preprocessing may be delegated to a third party service responsible for outsourcing the search index/ciphertexts to the server, and the secret state to the client. The engine may be configured to perform filtering of the candidate ciphertexts on the server-side, in order to eliminate false positives and reduce communication with the remote client.

Figure 1:
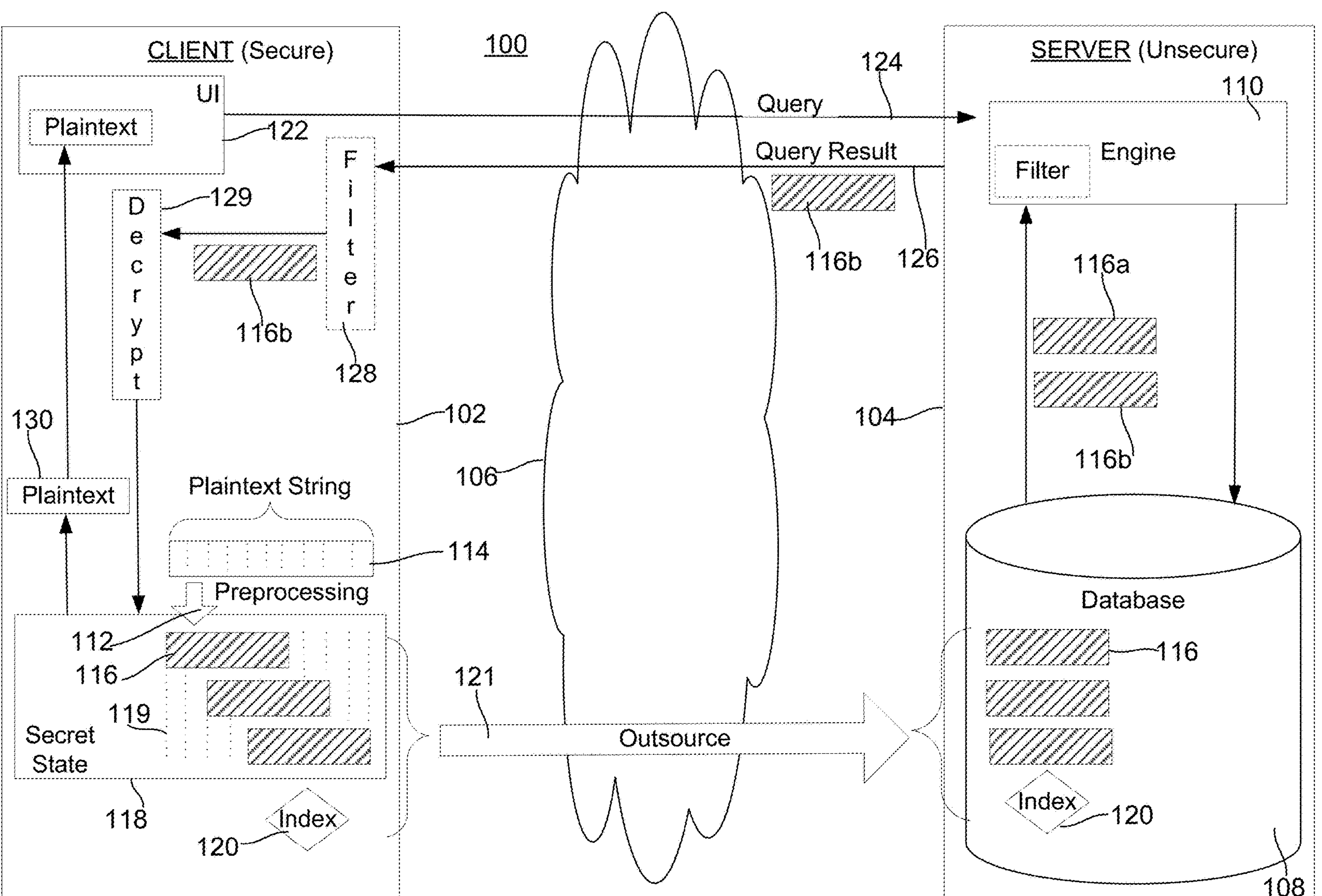
FIG. 1 shows a simplified diagram of a system according to an embodiment.

FIG. 1 shows a simplified view of a system configured to implement substring according to an embodiment. Specifically, system 100 comprises a secure client 102 offering a trusted environment, that is in communication with unsecure server 104 via communication network 106.

Server 104 includes database 108 and engine 110. The role of the database is to store outsourced data in encrypted form for secure access over the cloud—e.g., as part of a Database as a Service (DBaaS) offering.

Accordingly, as part of preprocessing 112, the client takes a plaintext string 114 that is to be remotely stored, and divides it into a plurality of overlapping plaintext substrings. Those fragments are also referred to herein as k-grams.

According to one very simple example, the original plaintext string may comprise the word “banana”. The corresponding overlapping plaintext fragments could include occurrences of the substrings: “ban”, “ana”, and “nan”.

Next, as further part of the preprocessing the client encrypts each of these fragments according to an encryption procedure, creating a plurality of corresponding ciphertexts 116. In certain embodiment, the encryption may be according to a form of frequency-hiding order-preserving encryption.

Performing this preprocessing encryption step in the trusted environment of the client, results in a secret state 118 remaining on the client. This secret state includes the ciphertexts of the plaintext fragments as well as encrypted position information 119.

As a result of this pre-processing, the client also includes a privacy-preserving search index 120. Each encrypted ciphertext fragment is equipped with encrypted position information. Using a symmetric encryption scheme, the preprocessing encrypts the particular position information for each fragment. The set of tuples for all unique ciphertexts then represents the most simple privacy-preserving search index.

It is noted that as a result of the fragmentation process, a value of the ciphertext occurs exactly once. Hence even the same fragment maps to different order-preserving ciphertexts. This desirably results in a frequency-hiding scheme for the fragments, thereby enhancing security.

Next, as part of an outsourcing process, both the ciphertexts and the search index are outsourced 121 from the client to the server. The ciphertexts and search index are stored in the database, which can now be subjected to secure substring search according to embodiments.

In particular, based upon a user's input to user interface (UI) 122, the client may issue a query 124 to the server. In the simplified example given above, the query may request searching of the stored encrypted data for any occurrences of the word “banana”.

The engine 110 of FIG. 1 controls interaction with the database and the data stored therein. Specifically, in response to receiving the query, the engine references the search index to produce stored ciphertext candidates appearing to match the query.

FIG. 1 shows the database initially returning multiple ciphertext candidates 116*a*, 116*b* to the engine. However, as discussed in detail below, searching of data in fragmented, encrypted form may sometimes produce false positive results.

Accordingly, in certain embodiments the engine performs a filtering of the received ciphertext candidates on the server. Such server-side evaluation can involve performing range queries over multiple rounds of interaction with the client, and is discussed in detail below in connection with FIG. 6.

FIG. 1 then shows the server returning to the client, a query result 126 that reflects the filtering process performed by the engine. Here, one of the ciphertext candidates has been removed by the server-side filtering process.

Upon receiving the query result, as shown in FIG. 1 the client itself may perform optional filtering 128. Such client-side filtering can include position set reduction and/or fragment search, as is described below in connection with FIGS. 4 and 5 respectively.

Next, the client references the secret state in order to decrypt 129 the ciphertext into a plaintext search result 130. That plaintext search result is displayed in the UI for inspection and review by the user.

The simplified view of FIG. 1 shows the system comprising two parties (trusted client, unsecure server) with the preprocessing being performed on the client side. However, this is not required, and alternative embodiments could feature more than two parties.

For example, preprocessing involving string fragmentation and encryption is computationally expensive. Thus alternatively, this preprocessing could be performed instead by a dedicated trusted third party offering function as a service, ultimately communicating the search index to the server and the secret state to the client.

Figure 2:
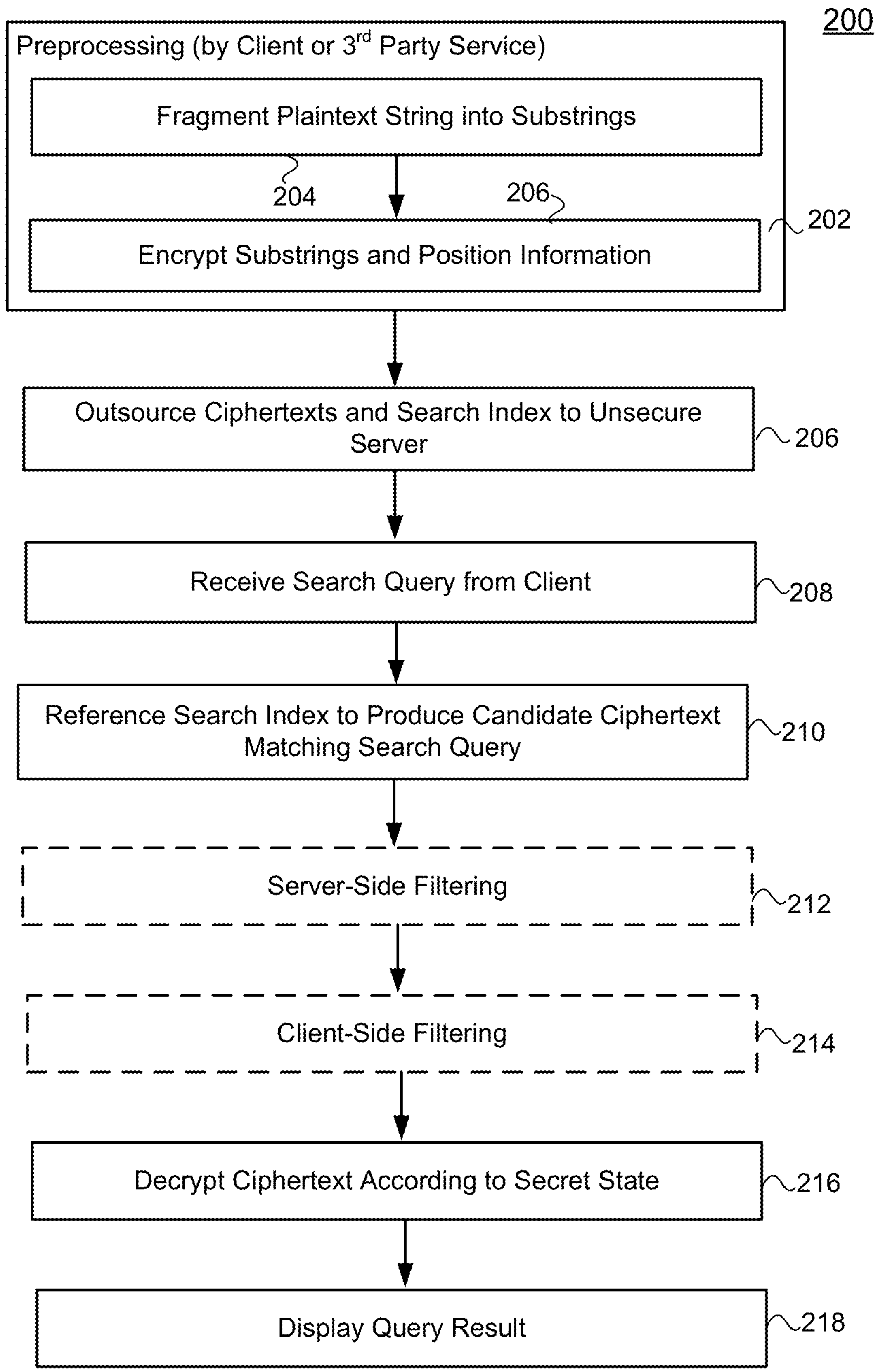
FIG. 2 shows a simplified flow diagram of a method according to an embodiment.

FIG. 2 is a flow diagram showing various actions taken in a method according to an embodiment. At 202, preprocessing of the plaintext string is performed. This preprocessing may be performed by a secure client or by a trusted 3rd party service A first preprocessing comprises fragmenting a plaintext string into substrings at 204. A second preprocessing comprises encrypting substrings and position information, resulting in 206 in a search index and corresponding ciphertexts.

At 208 the ciphertexts and search index are outsourced for storage on the unsecure server. Where the preprocessing is performed by a third party, the resulting secret state is communicated to the secure client.

At 210, a search query from the client is received at the server. At 212, the server references the search index to produce candidate ciphertexts matching the search query.

As discussed below, searching of encrypted data may result in false positives, which can be expensive to communicate to the remote client. Accordingly, at 212 the server may perform optional filtering.

At 214, the client may optionally perform filtering of ciphertext communicated back from the server to the client in response to the query.

At 216, the ciphertext received on the client-side is decrypted according to the secret state on the secure client. At 218 the client displays the query result, e.g., as part of a user interface.

Definitions of secure substring searching according to a particular embodiment, are now provided as follows. We write $[a,b]$ with $a,b \in N$ and $a<b$ for the range beginning at a and ending at b, $[a,b]=\{x \in N | a \leq x \leq b\}$. In this work we assume a string s with length l over an alphabet $\Sigma$, e.g., $\Sigma$ is the entire set of ASCII characters and string $s \in \Sigma^l$. Further, we write $|s|$ to refer to the length of this string so $|s|=l$. Denoting $s_i$ as the character of string s at position i, we define the k-gram of this string with position i as sequence of characters with length k starting at position i, i.e. $s_i \ldots s_{i+k-1} \in \Sigma^k$. Given a k-gram $kg \in s$, we denote $pos_s[kg]$ as the ordered list of all positions where kg occurs in s and $\#pos_s[kg]$ denotes the number of elements. Furthermore, we assume a total order over the alphabet $\Sigma$, so that it is possible to sort strings consisting of characters of the alphabet $\Sigma$, e.g., lexicographic order or an order that is based on the internal bit string representation.

The following encryption schemes are employed. In particular, in this work we utilize a symmetric encryption scheme with semantic security consisting of three polynomial-time procedures.

$k \leftarrow Gen(\lambda)$ is a probabilistic procedure that takes a security parameter $\lambda$ as input and outputs a secret key sk.

$c \leftarrow Enc(sk,m)$ is a probabilistic procedure that takes a secret key sk and a plaintext m as input and outputs a ciphertext c.

$m \leftarrow Dec(sk, c)$ is a deterministic procedure that takes a secret key sk and a ciphertext c as input and outputs a plaintext m.

Correctness requires $Dec(sk, Enc(sk,m))=m$ for all keys sk and valid messages m. Further, in some constructions we require deterministic encryption denoted as $Enc^{Det}$ such that $Enc^{Det}(sk,m_1)=Enc^{Det}(sk,m_2)$ iff.$m_1=m_2$.

In addition, we make use of a frequency-hiding order-preserving encryption (FHOPE) scheme comprising three polynomial-time procedures.

$ST \leftarrow Gen^{FHOPE}(1^\lambda)$ is a probabilistic procedure that takes a security parameter $\lambda$ as input and outputs a secret state ST.

$ST',y \leftarrow Enc^{FHOPE}(ST, x)$ is a probabilistic procedure that takes a secret state ST and a plaintext x as input and outputs an updated secret state ST' and ciphertext y.

$x \leftarrow Decr^{FHOPE}(sT, y)$ is a deterministic procedure that takes a secret state ST and a ciphertext y as input and outputs a plaintext m.

Correctness requires $Dec^{FHOPE}(ST, Enc^{FHOPE}(ST, x))=x$ for any consistent secret state ST and plaintext x. Further, the order-preserving property requires that the order of the plaintexts is preserved on the ciphertexts, that is, $y_1 \geq y_2 \Rightarrow x_1 \geq x_2$ with $y_i \leftarrow Enc^{FHOPE}(ST, x_i)$.

Note that our construction does not need the decryption functionality, so one can use a frequency-hiding order-preserving one-way function.

Details regarding secure substring search according to some embodiments are now described. In particular, we formalize a scheme that supports substring search over encrypted data. A substring searchable encryption scheme over an alphabet $\Sigma$ comprises the following procedures.

$Gen(1^\lambda)$ is a probabilistic procedure that takes a security parameter $1^\lambda$ as input and outputs a secret key sk.

$ST, I \leftarrow Enc(sk, s)$ is a probabilistic procedure that takes a secret key sk and plaintext string $s \in \Sigma^*$ as input and outputs a secret state ST and a privacy-preserving search index I.

$r \leftarrow Query(sk, ST, q, I)$ is a (possibly multi-round) protocol between a client and a server. The client's input is a secret key sk, a secret state ST and a substring $q \in \Sigma^*$ and the server's input is a privacy-preserving search index I. The client's output is a query result r comprising of $pos_s$ [q] and the server has no output.

Correctness requires that for each position i in the query result $r \leftarrow Query(sk, ST, q, I)$ for all ST, $I \leftarrow Enc(sk, s)$ it holds that $s_i, \ldots, s_{i+|q|}=q$. Further, completeness requires that for any query q, secret key sk and plaintext s all positions $i \in [0, |s|]$ such that $s_i, \ldots, s_i+|q|=q$ are contained in the query result $i \in r \leftarrow Query(sk, ST, q, I)$ with ST, $I \leftarrow Enc(sk, s)$. For example, assuming the outsourced plaintext string "banana" and the subsequent substring query "ana", the query result should be exactly the set of positions $\{1, 3\}$ in order to be correct and complete.

Note, that this substring searchable encryption scheme has no explicit decryption procedure but can be supplemented by encrypting the complete plaintext s with a general (semantic secure) symmetric encryption scheme. Further we assume the query length is small compared to the message length, i.e. $|q| << |s|$.

Details regarding implementation of secure substring search according to an embodiment, are now provided. For the goals of our encryption scheme (namely, easy deployment to existing database management systems and fast execution time for practical adoption), we propose different approaches that all provide the functionality of secure substring searches. The main idea is described first from a high level perspective, and then more details and different variations are provided.

Basic encryption is performed as follows. Before the data outsourcing step, a preprocessing encryption step must be performed in a trusted environment, resulting in a secret state ST remaining on the client and the privacy-preserving search index I that can be outsourced.

This step is done by the preprocessor, which could be the client's device. Alternatively, this step could be performed by a dedicated trusted third party offering this (potentially computational expensive operation, depending on the database size) preprocessing step as a service.

The secure outsourcing process may thus comprise a protocol between three parties:

i) the client who holds sensitive data,
ii) the preprocessor who transforms this sensitive data, and
iii) the untrusted database storing the privacy-preserving search index.

For simplicity, only the case of encrypting a single string is presented in the protocol of FIG. 3 described below. That can, however, be easily extended to support encryption of multiple strings (e.g., concatenate all strings and extend the position information with string identifier).

Given a string s to be outsourced, the preprocessor divides this string into $|s|$ overlapping k-grams denoted $g_1, \ldots, g_{|s|}$. These k-grams $g_j$ are then encrypted using a simple FHOPE encryption implementation resulting in their corresponding FHOPE ciphertexts denoted as $o_j$:

- build a map where each unique k-gram $kg_i$ is mapped to the list containing all position where said k-gram appears, i.e. $pos_s[kg_,]$;
- each position list $pos_s[kg_,]$ is permuted;
- sort this map lexicographically according to its keys, i.e. the set of all unique k-grams $kg_i$ appearing in string s;
- iterating over this sorted k-gram map, all positions are enumerated, resulting in one coherent ciphertext range for each k-gram $[o^{(kgi)}_1, o^{(kgi)}_{\#poss[kgi]}]$. The secret state ST must be maintained at the client side in order to allow the client to query this search index. That is, a map of all unique k-grams kgi together with the corresponding FHOPE-range, i.e. the lowest ciphertext $o^{(kgi)}_1$ and the highest ciphertext $o^{(kgi)}_{\#poss[kgi]}$.

Each value $o_j$ occurs exactly once, hence even the same k-gram maps to different order-preserving ciphertexts resulting in a frequency-hiding scheme for k-grams. Each FHOPE encrypted k-gram is equipped with encrypted position information. Using a common symmetric encryption scheme the preprocessor encrypts the particular position information poss $[kg_i]$ for each k-gram $kg_i$ resulting in $c^{kgi}_j = \mathrm{Enc}(sk, p_j)$ for all $p_j \in$ poss $[kg_i]$.

The set of tuples $(o^{kgi}_j, c^{kg}i_j)_{j=l, \ldots, \#poss\ kgi}$ for all unique $kg_i$ is then the most simple privacy-preserving search index I and the secret state ST is located at the client. The practical viability of this client state is evaluated in the formal Example given later below.

A formal description of the preprocessing and encryption step for one string is given in Protocol 1 of FIG. 3. An example for encrypting the string 'bananas' with k-gram size k=3 is given in Table 1 and Table 2 as follows.

TABLE 1

| Search Index I | |
|---|---|
| FHOPE | Position |
| 0 | Enc(sk, 4) |
| 1 | Enc(sk, 2) |
| 2 | Enc(sk, 6) |
| 3 | Enc(sk, 1) |
| 4 | Enc(sk, 3) |
| 5 | Enc(sk, 5) |
| 6 | Enc(sk, 7) |

TABLE 2

| Secret State ST | | |
|---|---|---|
| kGram | start | end |
| ana | 0 | 1 |
| as_ | 2 | 2 |
| ban | 3 | 3 |
| nan | 4 | 4 |
| nas | 5 | 5 |
| s_ | 6 | 6 |

Basic tokenization is now described. After the initial data preprocessing step, the resulting privacy-preserving search index I is transferred to the untrusted database. The secure state remains on client (or is transferred to the client in the case of using a trusted 3rd party for the initial preprocessing step). Recall, that the underlying database system can be any common database system like MySQL without further modifications; the secret state can be stored in another (trusted) database as well as in a plain textfile. Given a substring query $q = q_1, \ldots, q_l$ the client holding the secret states tokenizes this query to be compatible with the privacy-preserving search index.

For simplicity, first assume $l \leq k$, that is, the queried substring is at most as long as the k-gram length used during the preprocessing step. The client accesses the secret state and looks up the last indexed k-gram $kg_i$ that is smaller than q and the first indexed k-gram $kg_j$ that is greater than q (according to the defined order over alphabet $\Sigma$). Since the client state is stored in a sorted structure, this search can be completed in logarithmic time, e.g. by applying binary search. The corresponding FHOPE-range:

$$\rho^q = [\dot{\rho}^q, \bar{\rho}^q]$$

beginning at:

$$\dot{\rho}^q = o_{\#pos[kg_i]}{}^{kgi}$$

ending at:

$$\ddot{\rho}^q = o_1{}^{kgj}$$

is then evaluated on the database and results in all encrypted position information that substring occurs in the query. This encrypted result set is then transferred to the client and decrypted there.

Now we are ready for the more general construction for a substring query $q = q_1 \ldots q_l$ with $l > k$. In order to support such queries, the client transforms the substring query q into multiple (if possible disjoint) k-grams with size of at most k that overlap or follow directly (i.e., their relative distance is smaller or equal than k).

Therefore the client chooses a reference k-gram $kg_{ref}$, and assigns it the relative position $\delta_{ref}=0$. The relative positions $\delta$ of all other k-grams in the query are then given relatively to this reference k-gram. If any of these k-grams could not be found in the secret state, this k-gram was not part of the original text, and thus the query cannot be a substring of the indexed text. Otherwise, we know that all k-grams are part of string s, but not whether they build the desired substring. For that, the set of returned positions for each k-gram query is either decrypted on the client side and filtered for the correct positions offsets, or processed directly on the server side as discussed below.

We will use the statement:

$$\tau,\rho \leftarrow \text{convert}(ST,q)$$

to refer to the process happening on the client side before the actual database queries. In this case, $\tau$ contains the tuples $\tau_i=(kg_i, \delta_i)$ and $\rho$ is a map where every k-gram $kg_i$ is mapped to a FHOPE-range $\rho_i$. Note that the result of this process is not unique, hence the same substring query can result in different k-gram queries even comprising a different number of k-grams.

For example, the outsourced string 'bananas' and k=3 result in search index I and the secret state ST as given in Table 1 and Table 2 above. Assume the client is searching for the substring "anana", then one possible tokenization is the following:

{('nan', 0), ('ana', −1), ('ana', 1)} {'ana': [0, 1], 'nan' [4, 4]}←convert(ST, 'anana').

However, as we can see, this results in 3 tokens being generated, and none of them are disjoint from their neighbors. This is unlike, for example, simply generating the tokenization with maximal offset k {('ana', 0), ('na', 3)} {'ana': [0, 1], 'na': [4, 5]}←convert(ST, 'anana').

Moreover, the length of the FHOPE range is an indicator of how often a certain k-gram appears in the original text (e.g., k-grams like "the" or "of" appear much more often than others. This allows the client to optimize the convert process with respect to the filtering overhead. The server is queried for all FHOPE-ranges p computed by convert via common database queries. These FHOPE-range queries can be evaluated efficiently on standard databases due to preserved order of the k-grams after applying Protocol 1 and indexing techniques for range queries such as B-Trees.

Filtering strategies are now discussed. In particular, we discuss different approaches for filtering the result sets matching each FHOPE-range query.

For demonstration purposes, examples of resulting database queries in SQL are offered. Three different approaches are described, with varying filtering complexity for client and server.

On the one hand, the filter process can be executed solely on the client resulting in a one-round protocol. That is, all database queries can be sent in one batch without waiting for intermediate result sets.

On the other hand, the server side evaluation is based on a two-round protocol but omits any postprocessing (except decryption) required by the client. The impact upon performance in different scenarios is evaluated in the example below.

One filtering strategy is position set reduction. This is the most straightforward solution.

Namely, every FHOPE ciphertext-range $\rho_i$ is queried separately on the database, resulting in position sets $pos_s[kg_i]$ for each unique k-gram $kg_i$. Note, that these FHOPE-ciphertext range queries can be submitted in one (parallel) batch denoted as batchQuery( ) in Protocol 2 with the corresponding SQL queries:

SELECT Pos FROM Index WHERE ($\dot{\rho}_0$<FHOPE<$\bar{\rho}_0$)
SELECT Pos FROM Index WHERE ($\dot{\rho}_1$<FHOPE<$\bar{\rho}_1$)
. . .

The complete position filtering process is performed afterwards on the client side according to their position offset $\delta_i$. In more detail, given the position set $pos_s[kg_{ref}]$ of the reference k-gram, each other position set $pos[kg_i]$ is corrected by adding $\delta_i$. The intersection of all these corrected position sets contains the actual positions the queried substring occurs:

$$\cap_{(kg_i,\delta_i)\in\tau}\{p+\delta_i|p \in pos[kg_i]\}.$$

The complete filtering procedure is described in Protocol 2 of FIG. 4.

Fragment search is another filtering strategy. The position set reduction filtering process described above occurs completely on the client side. That is, each separate k-gram query with a large result set increases the filtering overhead on the client side linear in its result set size.

By contrast, the fragment search filtering strategy strives for reduction of the filtering overhead on the client side, but increases it on the server side.

Again, we start with the FHOPE-encryption as described in Protocol 1 of FIG. 3, but omit the actual k-gram positions. Instead, string s to be outsourced, is chopped in multiple string fragments of length that overlap by length l, i.e.:

$$f_j=s_i, \ldots, s_{i+|f|} \text{ and } f_{j+1}=s_{i+|f|-1}, \ldots, s_{i+2|f|-1}.$$

This overlapping length is the maximal possible length for one substring query, otherwise substrings that are chopped into two different fragments are not correctly retrieved. Each fragment $f_j$ is encrypted using a general (semantically secure) encryption scheme and outsourced together with all FHOPE-encrypted k-grams of which said fragment comprises.

Given the FHOPE-ranges $\rho$ output by convert(ST,q) the client queries the fragments that are indexed with FHOPE-ciphers that fall within all $\rho_i \in \rho$ stated as queryAll($\rho$) in Protocol 3 of FIG. 5. This can be realized using SQL join operations as follows:

SELECT fID FROM Frags WHERE ($\dot{\rho}_0$<FHOPE<$\bar{\rho}_0$) AS T1 JOIN
SELECT fID FROM Frags WHERE ($\dot{\rho}_1$<FHOPE<$\bar{\rho}_1$) AS T2 ON T1.fID=T2.fID
. . .

The result set comprises all encrypted string fragments that contain each k-gram in $\tau$. However, this result set can raise false positives, due to wrong position offsets. That is, although all k-grams occur in the string fragment they do not coherently form the queried substring q. These false positives are filtered on the client side, based on the decrypted fragments. The corresponding formal description of the comprehensive procedure is given in Protocol 3 of FIG. 5.

A third filtering strategy of filtering on the server side, is now discussed. This solution decreases the filtering overhead on the client side to be linear in the result set size of the least frequent k-gram, but is two round interactive.

For this approach, we slightly modify the encryption procedure. More particular in line 12 of Protocol 1 of FIG.

3, the occurrence positions for each k-gram in the outsourced string is encrypted using a deterministic encryption scheme as defined above.

Note, that encrypting the positions with deterministic encryption does not weaken the security of the privacy-preserving index (since each position is unique). Rather, this provides the server the ability to check for equality on encrypted data.

In the first round, the client queries the k-gram with the smallest FHOPE-range as reference token $kg_{ref}$. The range size directly correlates with the result set size as highlighted previously. That is, each k-gram occurs as many times in string s as the FHOPE-range is long. The result set containing all matching positions pos[kgref] is returned to the client.

This set of matching positions is then decrypted on the client side and further processed in order to match for remaining k-grams' positions. For each k-gram $kg_i$ the offset $\delta_i$ is added $pos[kg_i]=\{p+\delta i|p \in pos[kg_{ref}]\}$ and encrypted, resulting in $Enc^{Det}(pos[kg_i])=\{Enc^{Det}(p+\delta_i)|p \in pos_{ref}\}$.

For each k-gram the FHOPE-range $\rho_i$ is then queried at the server together with the calculated position information $Enc^{Det}(pos[kg_i])$ labeled as queryInSet($\rho_i$, $Enc^{Det}$(pos $[kg_i]$)), e.g. using SQL syntax:

SELECT Pos FROM SearchIndex WHERE $\dot{\rho}_1$<FHOPE<$\overline{\rho}_1$
AND Pos IN $Enc^{Det}(pos[kg_1])$
AND $\dot{\rho}_2$<FHOPE<$\overline{\rho}_2$
AND Pos In $Enc^{Det}(pos[kg_2])$
. . .

The complete protocol is show in FIG. 6.

A security evaluation is now provided. In particular, we revise the IND-FAOCPA security definition for frequency-hiding order-preserving encryption.

Our indexing scheme for k-grams that provides functionality for substring searches fulfills this security definition, that is currently the strongest security definition for OPE-schemes known in the literature. However, even if the security is defined by this formal framework, the practical implications may not be clear.

Indeed, practical attacks may achieve a plaintext recovery rate up to 80% on a database encrypted under a OPE scheme that fulfills a formal security definition, namely POPF security. This has been possible by exploiting auxiliary data that has a similar structure as the actual encrypted database.

As a result, we evaluate the implications of the formal security definition for the use-case of indexing k-grams from a practical perspective. Our analysis is based on the best known and published attack on frequency-hiding order-preserving encryption.

A formal security definition is now provided. The formal security for frequency-hiding order-preserving encryption is based on the (not necessarily unique) randomized order of two plaintext sequences defined in the following.

Definition 5.1 (Randomized Order). Let n be the number of not necessarily distinct plaintexts in sequence $X=x_1, \ldots, x_n$ ($\forall i$: $x_i \in N$). For a randomized order $\Gamma=\gamma_1, \ldots, \gamma_n$ (with $\forall i$: $1 \le \gamma_i$, $\le n$, $\forall_i$, j: $i \ne j \Rightarrow \gamma_i \ne \gamma_j$) of sequence X it holds that:

$$\forall i,j: x_i > x_j \Rightarrow \gamma_i > \gamma_j; \text{ and}$$

$$\forall i,j: \gamma_i > \gamma_j \Rightarrow x_i \ge x_j$$

The security game for FHOPE-encryption is defined between an adversary A and challenger C as follows:

Adversary A chooses two sequences $X_0$,$X_1$ such that they have at least one common randomized order Γ.

Challenger C flips a coin b and encrypts Xb and sends this encrypted sequence back to A.

Finally the adversary outputs a guess b' and wins the game if b=b'.

If the adversary's advantage is negligible, then the FHOPE-encryption is said to be IND-FAOCPA (indistinguishable under frequency-analyzing ordered chosen plaintext attack).

It is clear that our indexing scheme does fulfill this security definition since all k-grams are ordered during the encryption step, hence in practice all possible k-gram sequences of length n have the same randomized order, namely 1, . . . , n.

Following the cryptographic approach of indistinguishability we state security based on the following definition.

Definition 5.2 (IND-CPA-IOQ). Let Π=(Gen,Enc,Query) be a scheme with support for substring search over encrypted data. We define the security experiment $Exp^{\Pi}_{A}(1^{\lambda})$ for Π as follows.

Challenger C creates a secret key $sk \leftarrow Gen(1^{\lambda})$.

Adversary A chooses two strings $s_0$, $s_1$ with $|s_0|=|s_1|$.

Challenger C flips a coin b, calls $ST_b$, $I_b \leftarrow Enc(sk, s_b)$ and sends $I_b$ to A.

Adversary A submits two query sequences $Q_0$,$Q_1$ with the same length. Each sequence must be transformable into (multiple) range queries $\rho_0$, $\rho_1$ such that $\rho_0=\rho_1$ (relative to $ST_b$) and result in the same sized access pattern.

Challenger C simulates Query(sk, $ST_b$, $q_b$, $I_b$) and sends the transcript VIEW of these query executions to A.

Adversary A outputs a guess b' and the experiment outputs 1 if b=b'.

The encryption scheme Π with support for substring search over encrypted data is indistinguishable under chosen plaintext attacks for identically ordered queries if all probabilistic adversaries A win this experiment with negligible probability $$|Pr[Exp^{\Pi}_{\mathcal{A}}(1^{\lambda})]-1/2| \le \epsilon.$$

Note, that the restriction on queries ($Q_0$,$Q_1$) with one common randomized order relative to $ST_0$, $ST_1$ is required. Otherwise an adversary could win the game trivially.

For example, assume k=3 and two strings (over the English alphabet with lexicographic order) $s_0$="beefs" and $s_1$="lulua" resulting in $ST_0$=(bee, eef, efs, fs_, s_) and $ST_1$=(a_, lul, lua, ua_, ulu). Two valid query sequences for the experiment are $Q_0$=(e_,s_) and query$Q_1$=(lu_,ulu) both transformed to range queries $\rho_0=\rho_1$=([1-2]). The restriction of same sized access pattern requires that for each substring query out of set $Q_b$ all k-grams forming these queries have the same number of occurrences.

Further, the transcript VIEW is the view of a semi-honest server, comprising all messages sent from the client to the server.

Theorem 1. The two round interactive protocol for substring queries over encrypted data with filtering on the server side as described in Protocol 4 of FIG. 6, is IND-CPA-IOQ secure, if the underlying deterministic encryption is secure and the frequency hiding order preserving encryption is IND-FAOCPA.

The security proof for Theorem 1 is now sketched, due to the application of the weakest encryption procedure for the position information: that is, deterministic encryption (e.g. implemented by a blockciphers with fixed initialization vector). We model this deterministic encryption by a pseudorandom permutation F defined as follows.

Definition A.1 (Pseudorandom Function). Given an efficient computational keyed function F: $\{0, 1\}^{\lambda} \times \{0, 1\}^{n} \rightarrow \{0, 1\}^{n}$, we say F is a pseudorandom permutation (PRP) if for all PPT distinguishers D, the advantage defined as:

$$|\Pr[\mathfrak{D}^{P(k,\cdot)}(1^\lambda)=1|-\Pr[\mathfrak{D}^{f(\cdot)}(1^\lambda)]|=\epsilon$$

is negligible.

Here $k \leftarrow \{0, 1\}^\lambda$ is secret key sampled uniformly at random and f: $\{0, 1\}^n \rightarrow \{0, 1\}^n$ is a function chosen randomly from the set of all functions mapping bitstrings with length n to bitstrings with the same length n.

We use the security of pseudorandom permutations together with the formalization of frequency hiding order preserving encryption to give an intuition of the security proof for Theorem 1.

For this proof we present a sequence of games $\{G_0, G_{1,i}, G_{2,j}\}$, each outputting a transcript $VIEW_0(b)$, $VIEW_{1,i}(b)$, $VIEW_{2,j}(b)$. The games $G_{1,i}$ are hybrid games where we modify the i-th encrypted position information returned by any k-gram query. The games $G_{2,j}$ are hybrid games where we modify the j-th encrypted position information never returned by any k-gram query but stored in the encrypted index. By i-th and j-th encrypted position information we assume an implicit order over ciphertexts according to their bit representation. Each game gradually differs, until the transcript of the final game is independent of the sampled bit b by the experiment, hence the adversary can only guess b' with probability 1/2 in the final game.

We argue that each game is indistinguishable from the previous game except with negligible probability, hence the view of the first game and the final game is also indistinguishable except with negligible probability.

$G_0$: In this game we follow the experiment for IND-CPA-IOQ hence output the real transcript $VIEW_0(b)$ the attackers observes.

$G_{1,1}$: In this game we simulate the first encrypted position information returned by any k-gram query. That is, we replace the first returned encrypted positions (both in the query result and the encrypted search index) with a randomly sampled bitstring in $\{\mathbf{0}, \mathbf{1}\}^n$. Denote the modified transcript with $VIEW_{1,1}(b)$. Note that positions returned multiple times, e.g., because a substring query is repeated, are always replaced with the same sampled bitstring.

$G_{1,i}$: In this game, we simulate all encrypted position information up to the i-th value returned by any k-gram query.

$G_{2,1}$: In this game we simulate the first encrypted position information stored in the encrypted search index but never returned by any k-gram query. That is, we replace the first returned encrypted position in the search index with a randomly sampled bitstring in $\{0, 1\}^n$. Denote the modified transcript with $VIEW_{2,1}(b)$.

$G_{2,j}$: In this game we replace the deterministic encryption of the j-th positions never been returned with randomly sampled bitstrings $\{0, 1\}^n$.

The transition from one game to the next game is indistinguishable for the adversary except with negligible probability $\epsilon$, otherwise the adversary could attack the random permutation. Denoting n as the number of replaced encrypted values, the overall probability for an adversary to distinguish $G_0$ from $G_{2,1}$ is $n\epsilon$.

In the last game ($G_{2,1}$) all deterministically encrypted values are replaced with random strings and hence are independent from the sampled bit b. Since the range queries $Q_0$, $Q_1$ have the same ordering by definition of the security, this completes the proof.

Various details of implementing secure substring search according to particular embodiments, are now discussed in connection with the following example of an attack.

EXAMPLE

For a better understanding of the practical implications of using an IND-FAOCPA secure FHOPE-scheme for outsourcing k-grams, FHOPE-encrypted k-gram indexes were subjected to a bucketing attack. The bucketing attack is based on the assumption that an attacker has access to auxiliary data with similar structure as the FHOPE-encrypted target data. That is, the attacker's auxiliary data and target data are drawn from the same value domain (in this string example the same k-gram distribution over the same alphabet Σ) with a similar underlying distribution. Given encrypted target data of length n and sufficient (i.e. with length greater than n) auxiliary data, the attacker samples n values from the auxiliary data.

In this particular attack, these values are classified corresponding to their pre fix of length β, every bucket is labeled with such a prefix. Then the upper and lower bound on the rank of all elements in each bucket is calculated.

Following our construction these ranks are the same as their FHOPE-ciphertext values. So these buckets give an approximation of all ciphertexts that share the same prefix with length β. This data sampling and bucketing process is repeated 1 times and the border rank values for each bucket are averaged. Finally, the most common plaintext for each averaged bucket is the guess for the target ciphertext that falls within that averaged bucket range.

As a practical security analysis, the bucketing attack is evaluated as follows. Each guess by the attacker is counted as successful if the mapping from the FHOPE-ciphertexts to the corresponding k-gram is correct. The attacker's success ratio is the number of correct guesses divided by the overall FHOPE-encrypted k-grams. Each measurement has been repeated 100 times and the mean value is calculated.

Attacks are based on the Enron dataset. More particular, both the auxiliary data and the challenge data is chosen out of the same dataset collection.

As a first baseline evaluation, the attack is performed where the attacker can access parts of the challenge data as auxiliary data, and this known part is increased successively. In more detail, we evaluated how successful the bucketing attack is with auxiliary data chosen as 500 random files and partly used the same file set as challenge data. We set the bucketing prefix parameter β=3 and varied the k-gram size between 3 and 7. Note, that β=k=3 is a special case in which each bucket has only one element, hence the bucketing attack corresponds to the sorting attack on frequency-hiding order-preserving encryption.

Figure 7:
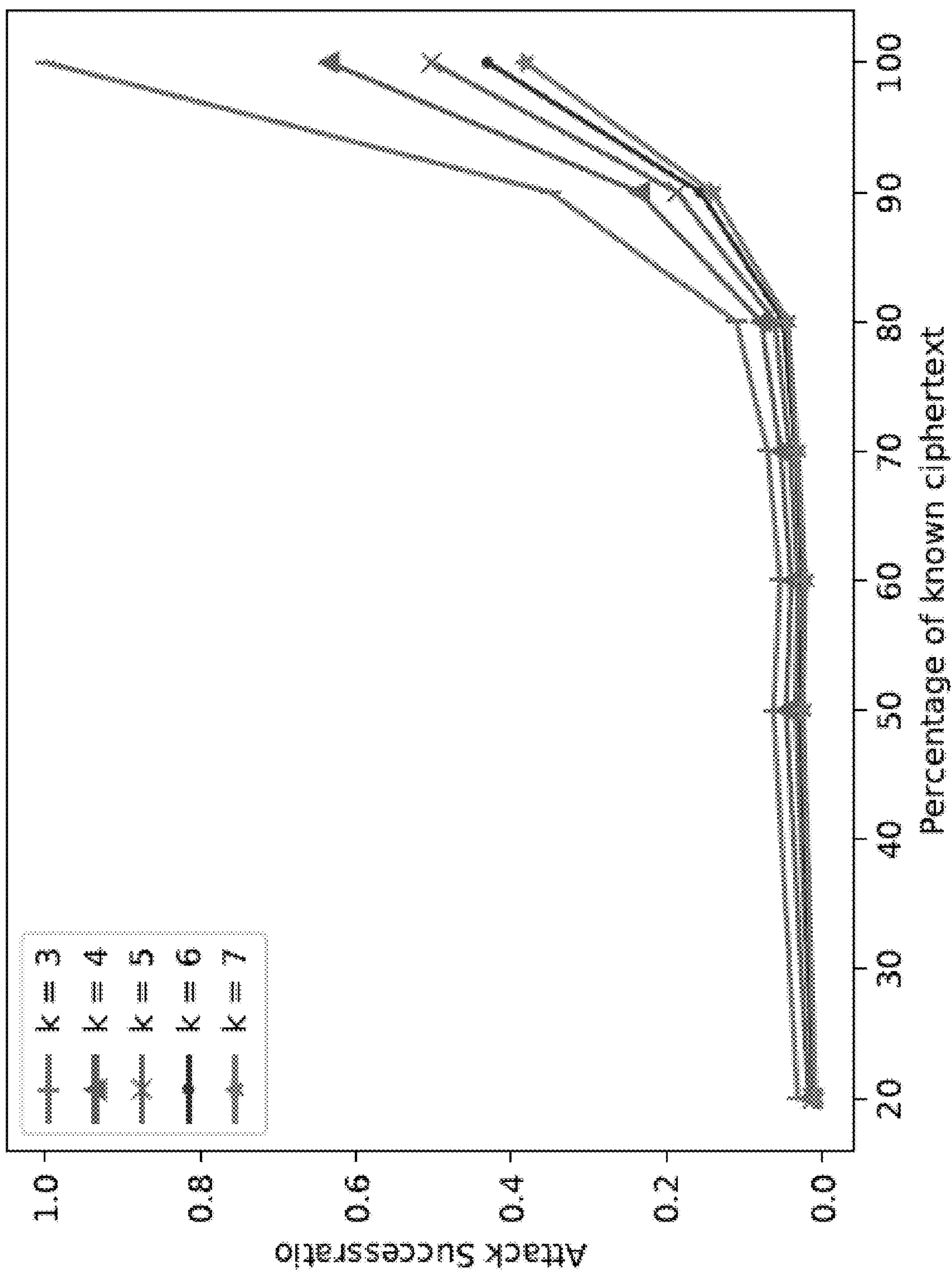
FIG. 7: Attacker's advantage with partly known plaintext
Figure 8A:
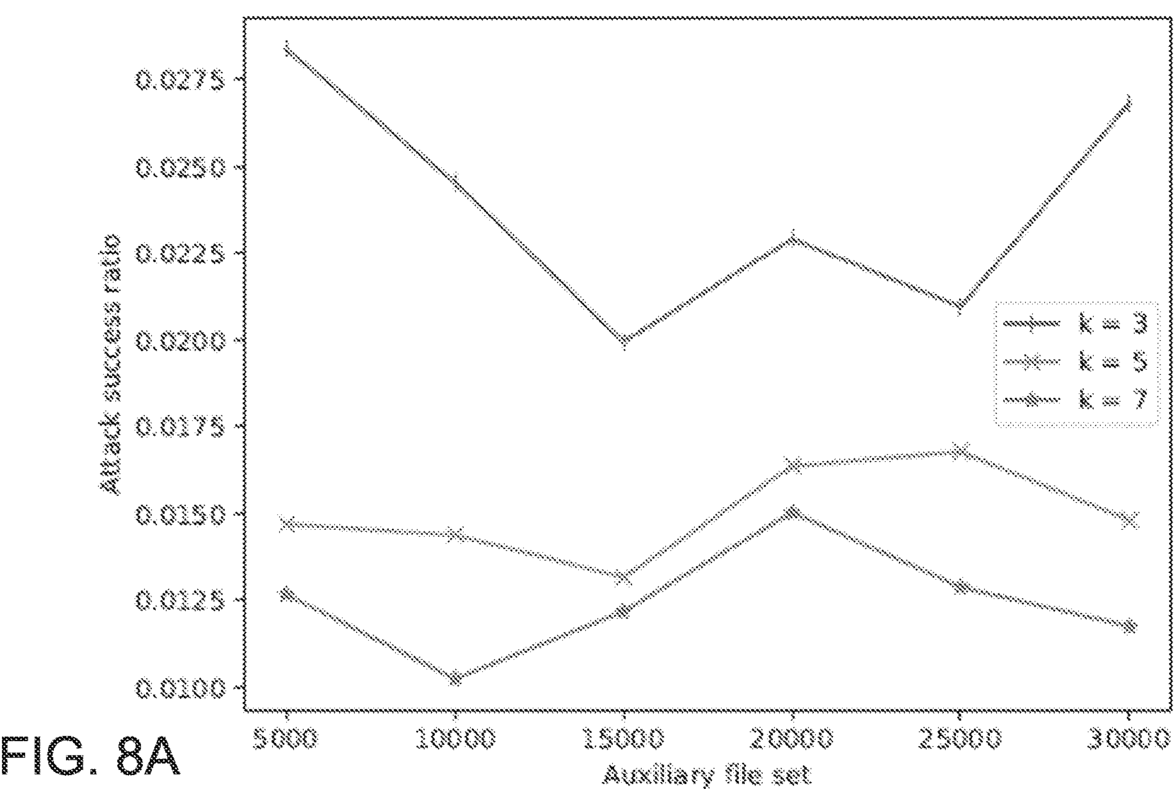
FIG. 8A-B plot case sensitive attacks on dataset filtered for special characters and different auxiliary dataset sizes, for 200 and 2000 target files, respectively.
Figure 8B:
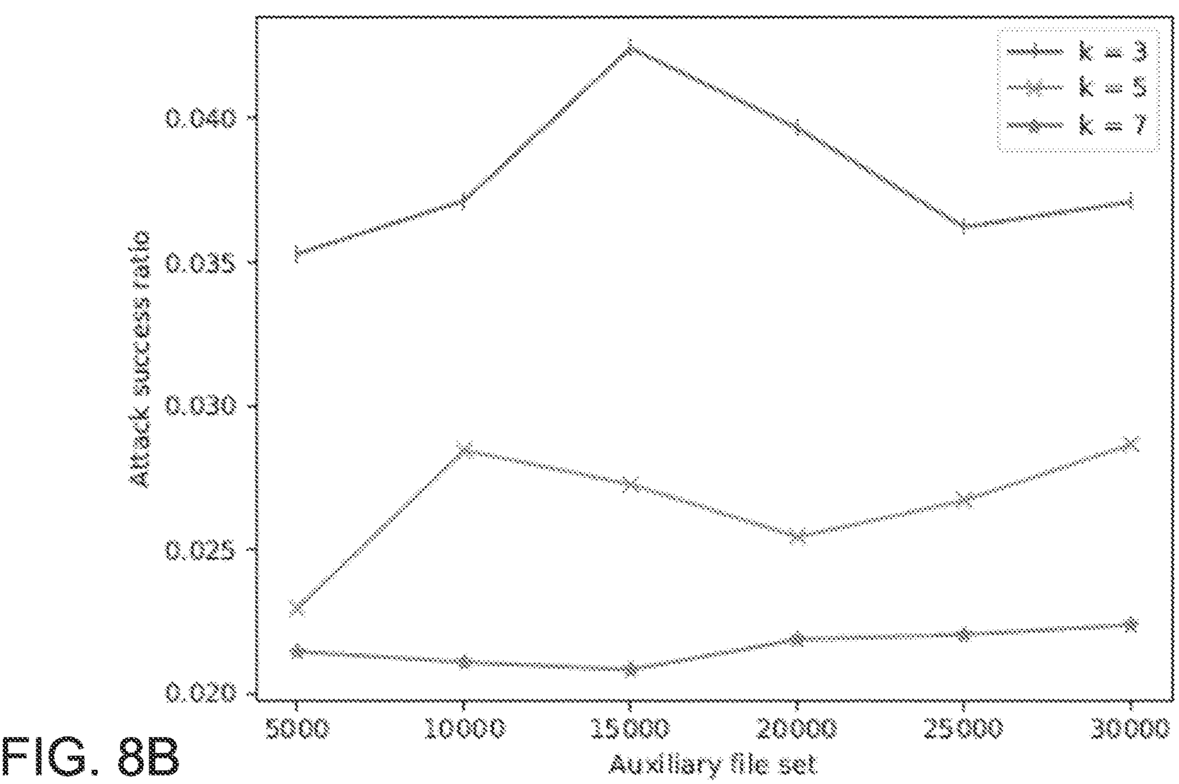
Figure 9A:
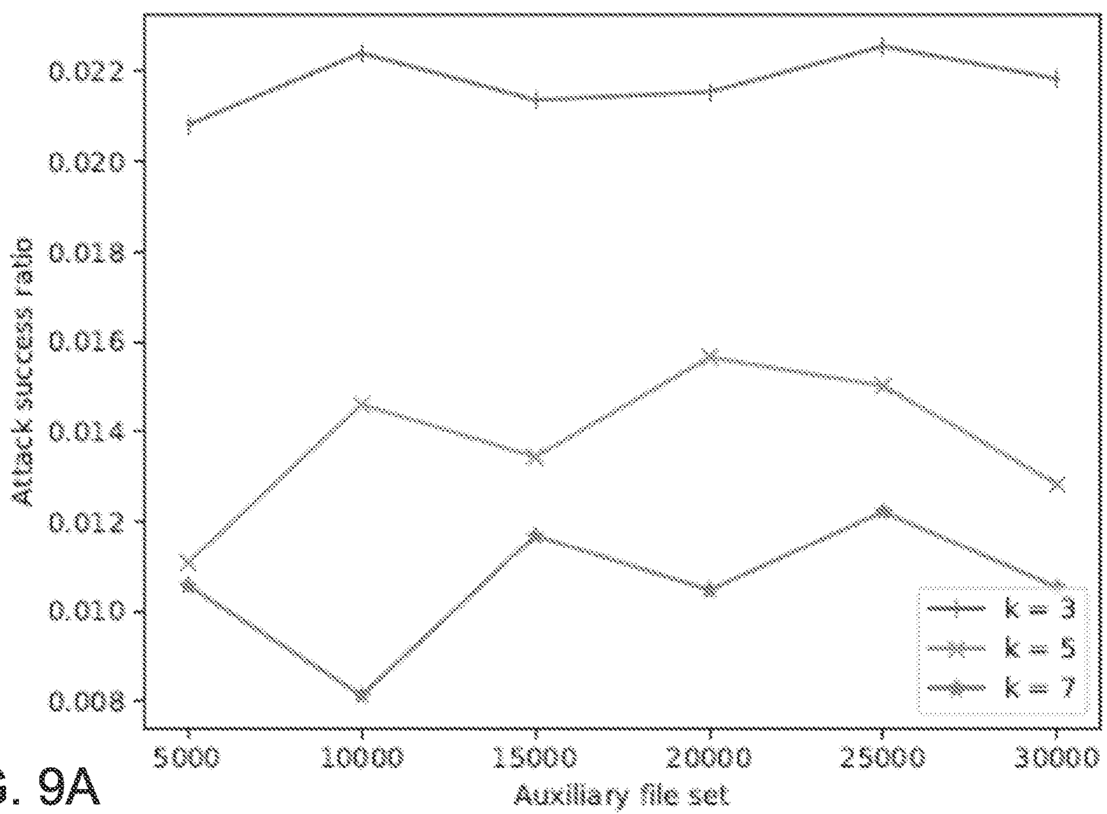
FIG. 9A-B plot case sensitive attacks on unfiltered dataset and different auxiliary dataset sizes, for 200 and 2000 target files, respectively.
Figure 9B:
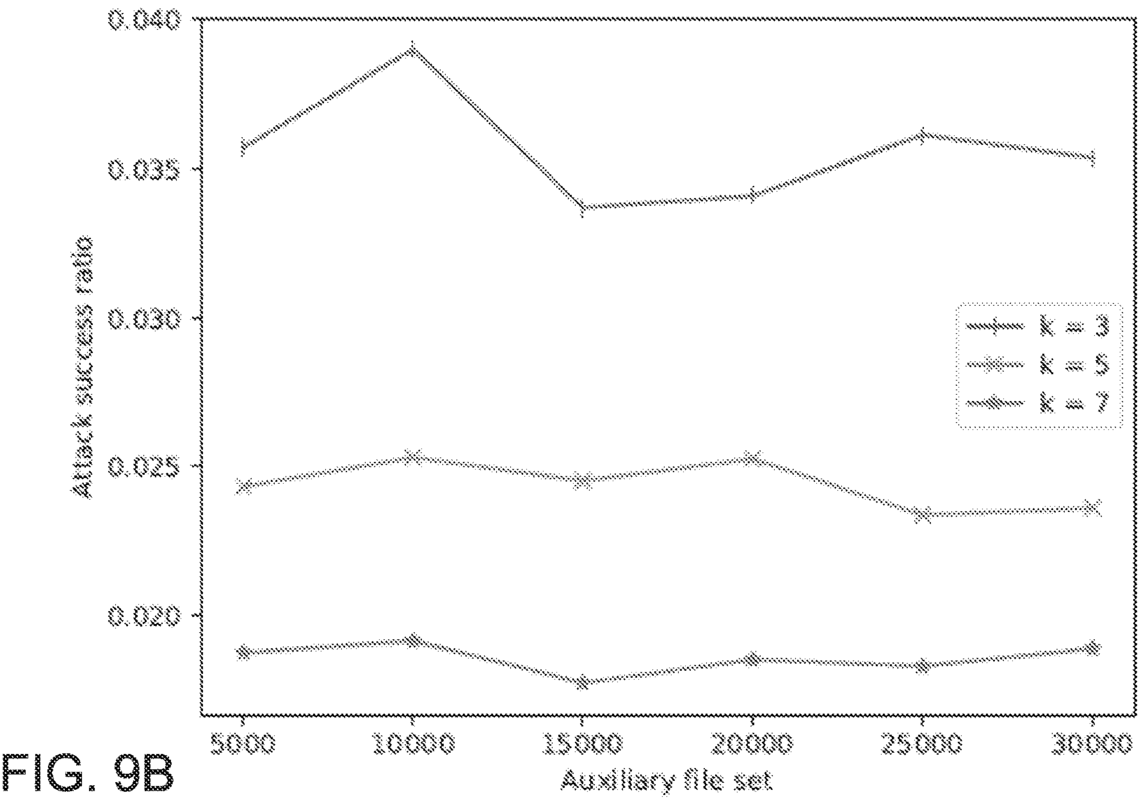
Figure 10A:
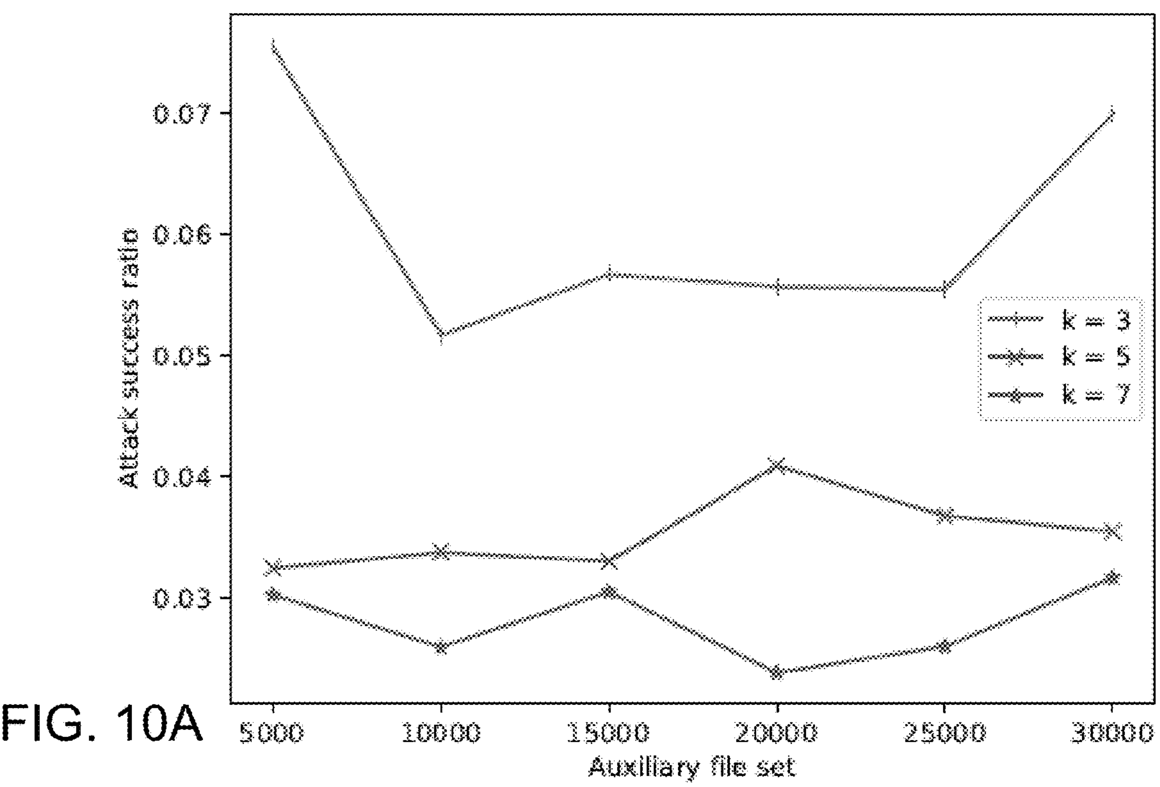
FIG. 10A-B plot lower case attacks on dataset filtered for special characters and different auxiliary dataset sizes, for 200 and 2000 target files, respectively.
Figure 10B:
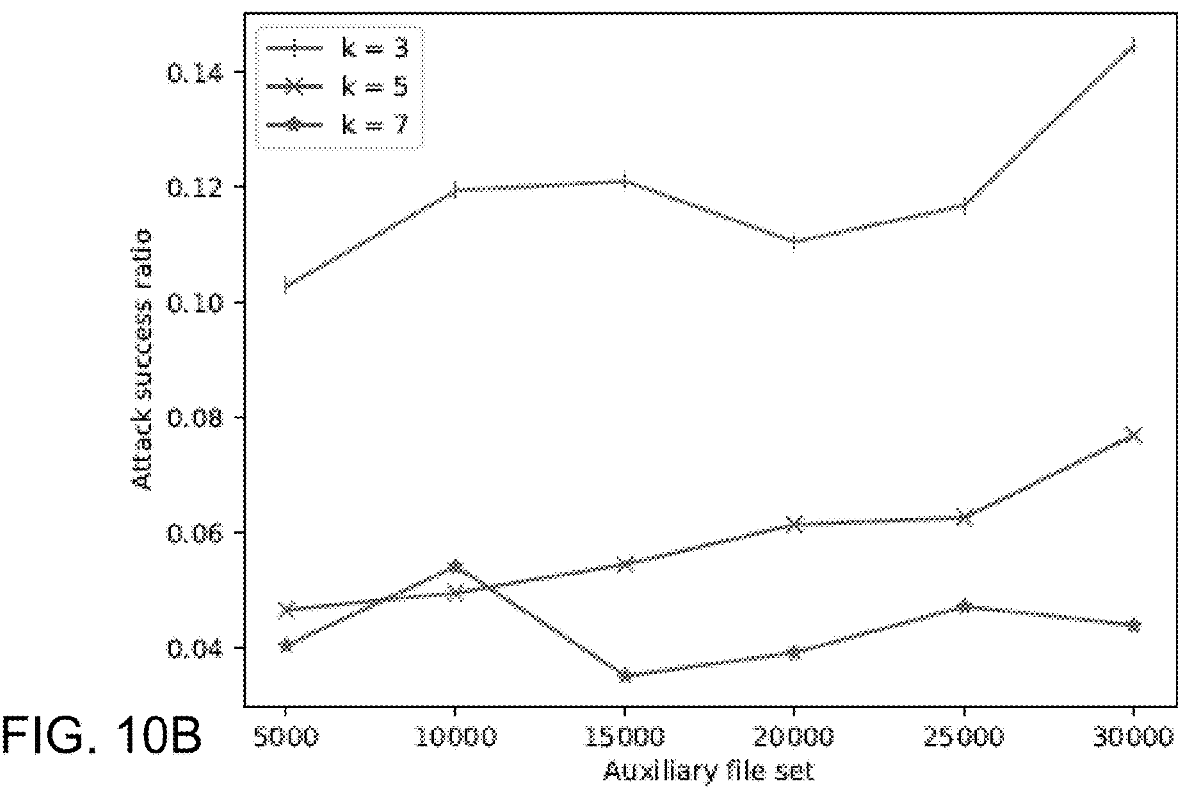
Figure 11A:
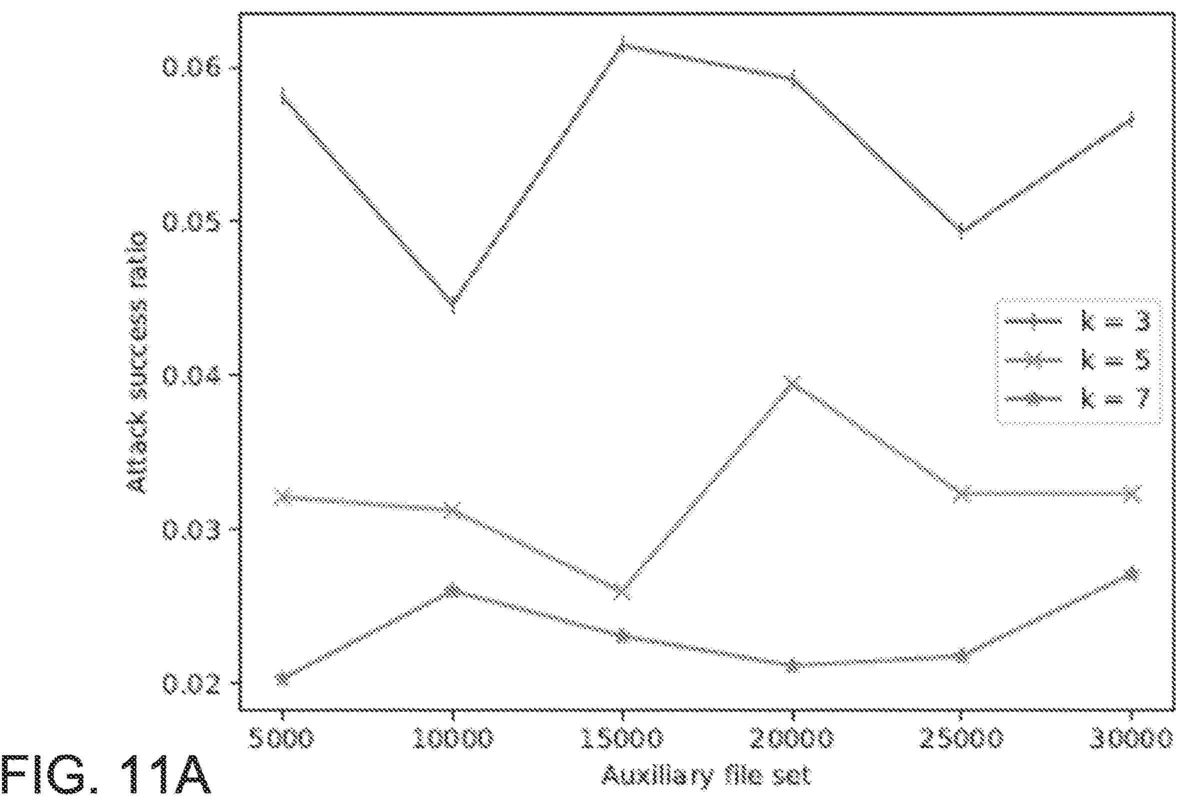
FIG. 11A-B plot lower case attacks on unfiltered dataset and different auxiliary dataset sizes, for 200 and 2000 target files, respectively.
Figure 11B:
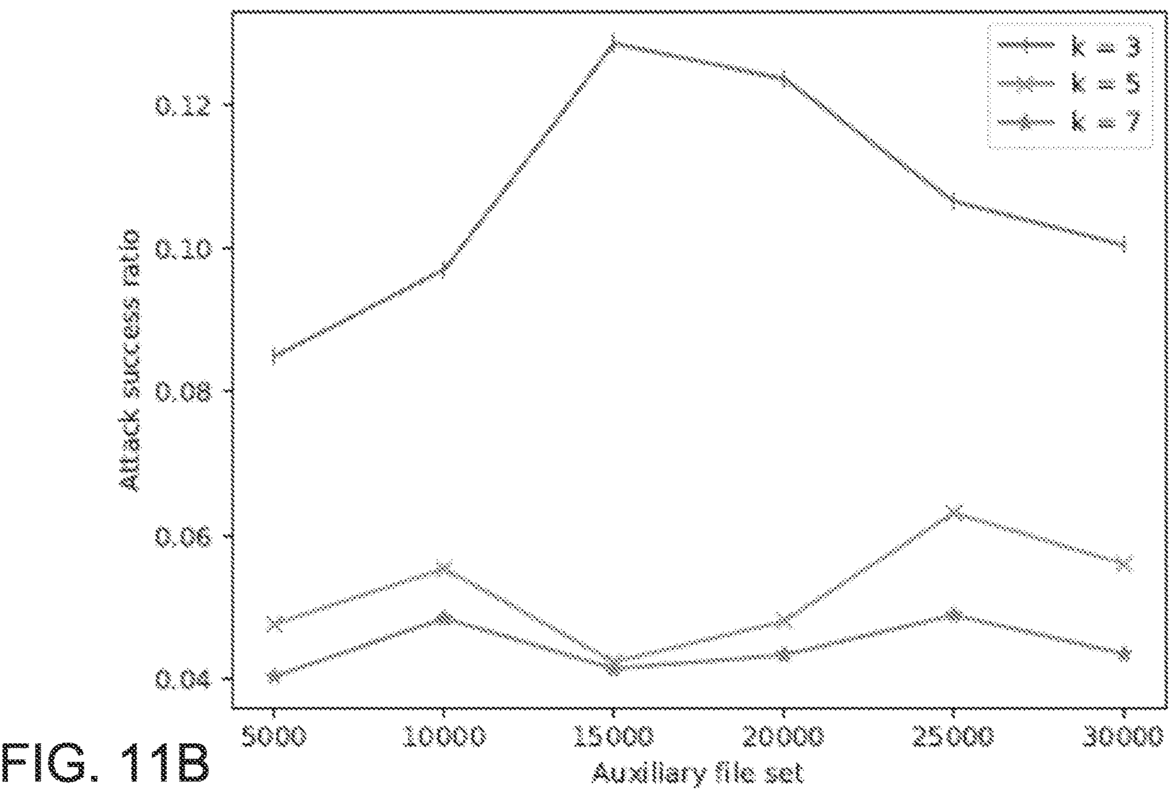

In the case of full knowledge about the known challenge text (dense knowledge), the sorting attack has 100% success rate. The attacker's advantage for different k-gram sizes and different fractions of known plaintext is shown in FIGS. 7A-B.

Further, a series of more comprehensive attacks were executed where the dataset size was fixed for values within {200, 500, 1000, 2000} and increased the amount of auxiliary data the attacker has access to. We evaluated the effect of increased alphabet size by filtering the text for all special characters in FIGS. 8A-B and 9A-B, and by ignoring case-sensitivity in FIGS. 10A-B and 11A-B. We chose different k-gram sizes k, and fixed the prefix size β=2 with bucketing sampling process repeated 1=100 times. The attacker's success ratio decreases with increased k-gram size k for all data sets. For the case sensitive attacks we report attack success ratio between 1% and 3.5%, depending on the k-gram size chosen during the encryption step. As expected, the filtering process increases the attack success and the same is true for case-insensitive encryption since the target alphabet size decreases. That is, for the case insensitive attacks we report attack success ratio between 3% and 15%, depending on the k-gram size chosen during the encryption step.

We have prototypically implemented our substring search protocols in Oracle's Java 1.8. All client operations have been executed on Windows 10 with an Intel i7 6600U CPU @ 2.6 GHz and 16 GB main memory. As database system we chose MySQL running in the same LAN with 4 Intel XEON E5-2670 @ 2.6 GHz processors and 256 GB main memory.

We ran all our evaluations on subsets of the Enron dataset. The subsets are sampled randomly for each run.

Viability of the client state is now discussed. Recall, that the client stores a secret state mapping each k-gram to a range of FHOPE ciphertexts. In a first step we analyzed the compression ratio for the client state depending on the used k-gram size and the outsourced amount of files. We have randomly sampled different numbers of files and counted the number of overall k-grams and the number of unique k-grams that are stored in the client's state. The compression ratio is the overall k-gram number divided by the number of unique k-grams. We repeated each file sampling 10 times and averaged the compression ratio for all runs. This was performed with and without a preprocessing step in which all special characters have been filtered out.

Figure 12A:
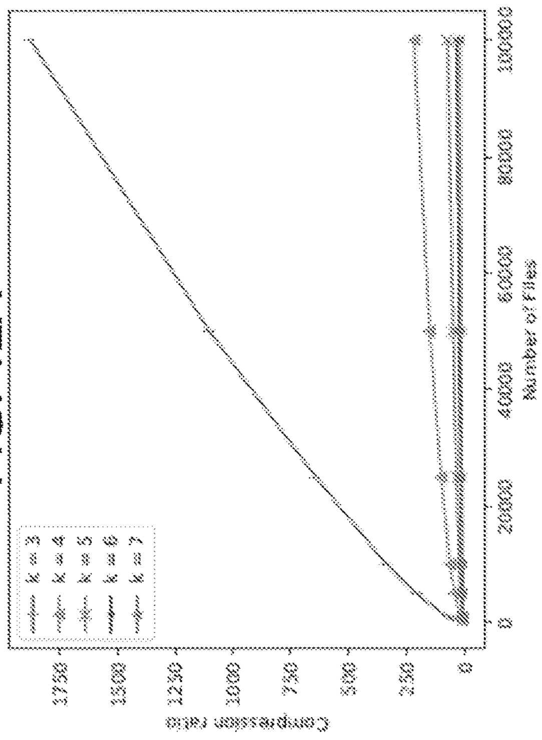
FIGS. 12A-B plot compression ratio without and with preprocessing respectively, for different k-gram sizes and indexed files.
Figure 12B:
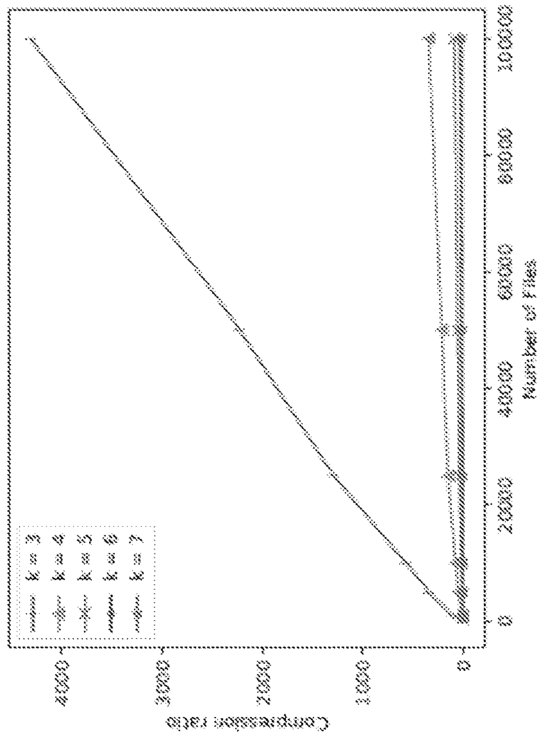

As seen in FIG. 12A (without the preprocessing step) and in FIG. 12B, this compression ratio highly depends on the chosen k-gram size k and the possible alphabet size since the number of all possible k-grams is $|\Sigma|^k$ ($|\rho|$ is decreased with the preprocessing step). For 100,000 not preprocessed files consisting of 255,322,941 k-grams in average the number of unique k-grams varied from 138,242 for k=3 up to 3,410,053 for k=7. With the character filtering step before the actual outsourcing, the overall number of k-grams is 216,817,129 and the average number of unique k-grams varied from 50,315 for k=3 up to 10,313,490 for k=7.

Figure 13A:
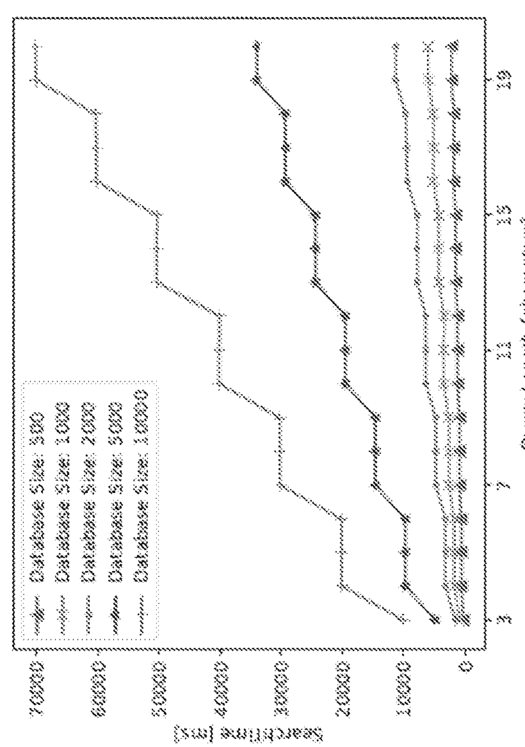
FIGS. 13A-B plot search time for different k-gram sizes using the position set reduction filtering strategy, for k-gram sizes 3 and 5 respectively.
Figure 13B:
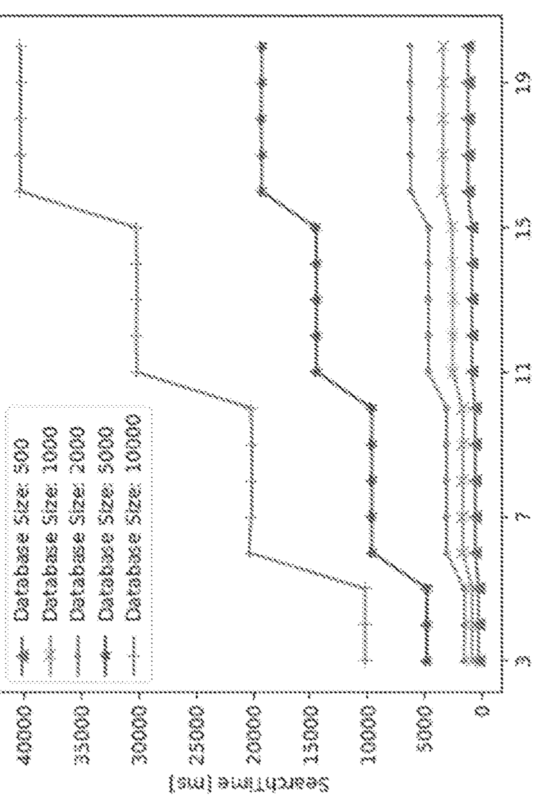
Figure 14A:
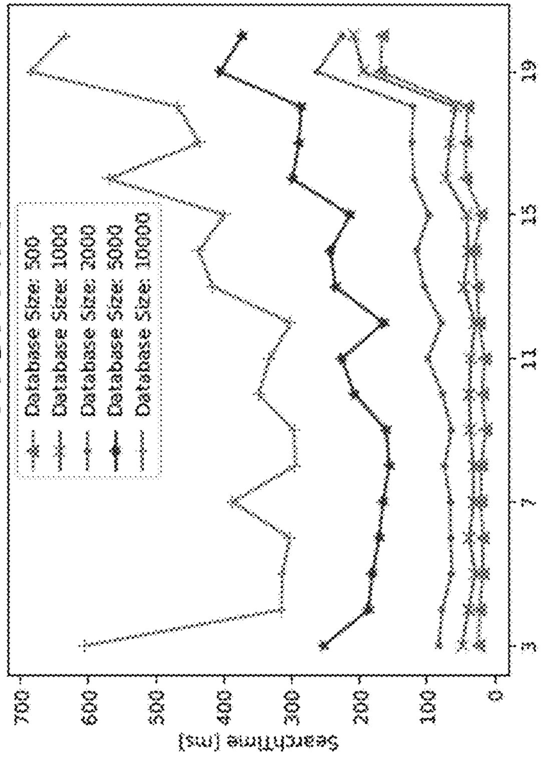
FIGS. 14A-B plot search time for different k-gram sizes using the fragment search filtering strategy, for k-gram sizes 3 and 5 respectively.
Figure 14B:
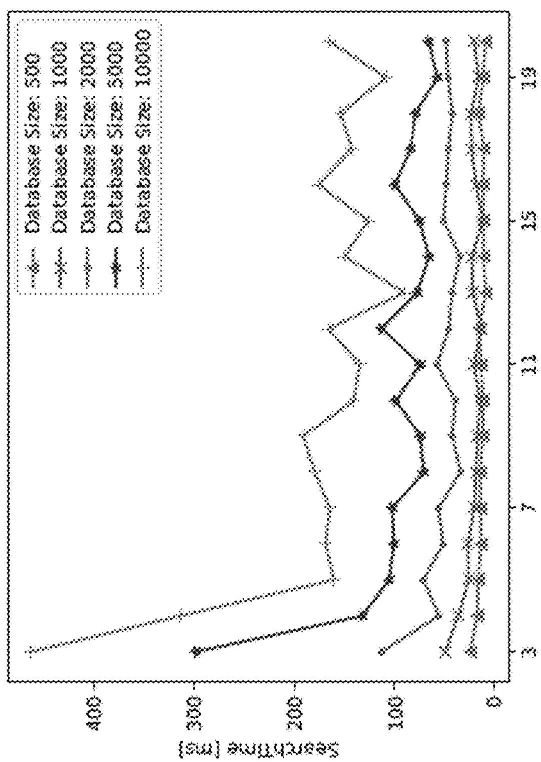
Figure 15A:
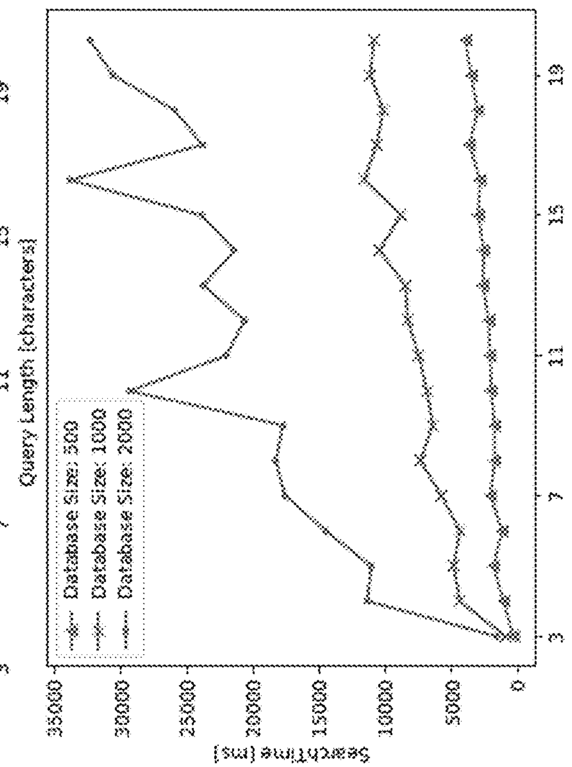
FIGS. 15A-B plot search time for different k-gram sizes using the filtering on the server side, for k-gram sizes 3 and 5 respectively.
Figure 15B:
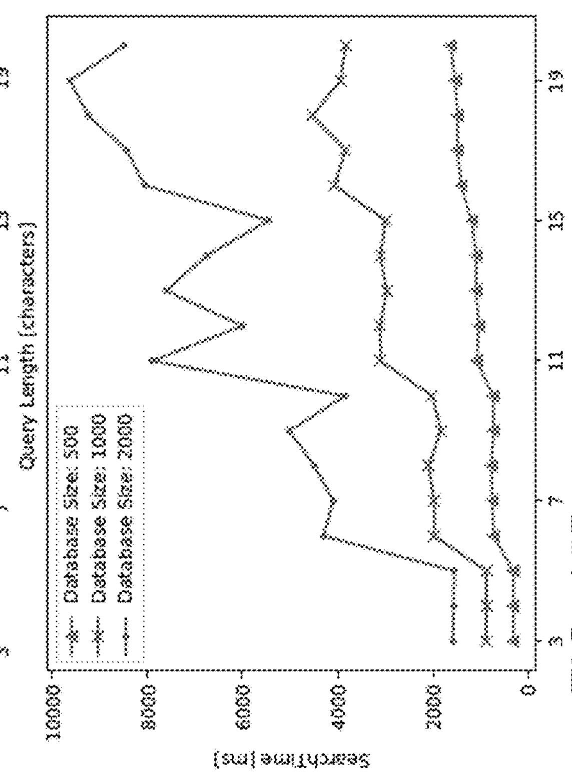

Substring search time is now discussed. Various filtering strategies are evaluated:

the straightforward position set reduction (FIGS. 13A-B);

the fragment search (FIGS. 14A-B); and the filtering on the server side based on deterministically encrypted position information (FIGS. 15A-B).

All tests are run on an unmodified MySQL database accessed by the client via LAN interface and Java's JDBC driver. To evaluate the substring search in real-world scenarios, measurements contain the complete query answering time including network latency and client postprocessing time. That is, the measured times include token generation, query transmission over the LAN interface, the MySQL database together with the client's intermediate or post-processing step.

For each filtering strategy, we have evaluated the substring search time for different k-gram sizes 3, 5, 7, different query length starting with 3 up to 20 and a varying amount of indexed files out of the Enron dataset starting from 500 files up to 10,000 files. In order to be comparable, each measurement is given for the same indexed files and the same sequence of substring queries. Furthermore, each plotted data point is the mean value of 100 values. The search times for the position set reduction are illustrated in FIG. 13A for k-gram size 3, and FIG. 13B for k-gram size 5. The search time grows linearly with increased databased size, for example, doubling the indexed database size from 5000 to 10000 indexed files increases the mean search time for query length 3 from 5 seconds to 10 seconds. This effect is independent of the used k-gram size. Nevertheless, the k-gram size influences the search time depending on the query length since the k-gram size determines the required query rounds. That is, a substring query of length l on database outsourced with k-gram size k requires [l/k] FHOPE range queries and each query induces an additional scan of the complete database. Hence, the search time increases linearly with the number of required FHOPE range queries; a greater k-gram size supports longer substring queries with the same number of FHOPE (SQL) range queries. Compared to the other filtering strategies, the processing time of this method is not affected by the result set size.

The search times for the fragment search are illustrated in FIG. 14A for k-gram size 3, and FIG. 14B for k-gram size 5. The fragment size has been set to 500 characters with 21 characters overlapping. Note that this filtering strategy can be performed with one single SQL query hence the round trip time is minimized. Further, the FHOPE-range queries are evaluated on fragment IDs instead of the complete position information, decreasing the processing complexity (by approximately the fragment size).

We identified two main parameters that affect the query time. First, the result set size has great impact, especially for short substring queries, since all (encrypted) matched fragments are transferred to the client for post processing. Second is the parameter of the required number of JOIN operations that are evaluated on the database. Given a fixed k-gram size k, this correlates with the number of k-grams the substring query consists of, hence the length of substring query increases the processing time although the result set size decreases. Both effects can be observed in FIG. 14A.

The search times for filtering strategy on the server side using deterministic encrypted position information for k-gram size 3 and 5 are illustrated in FIGS. 15A and 15B. Again, both result set size and number of k-grams that form the substring query affect the search time, however, the effect is much stronger. Recall, that position set for the reference k-gram $pos_s[kg_{ref}]$ is corrected for each k-gram using the corresponding offset value and needs to be re-encrypted and transferred again to the database system. Hence, the overhead for the encryption operations multiplied by the number of k-grams the substring query is transformed to, resulting in high search times especially for small k-gram sizes and big databases.

Further extensions may support substring searches for dynamic databases. More particular, we discuss different approaches how to add strings to the outsourced database after the initial encryption process.

The initial preprocessing step—including encryption—is performed for the whole sensitive data collection once before the outsourcing process. Recall, that the resulting output of the preprocessing step consists of the privacy preserving search index I and the secret state ST.

This secret state ST can be exploited for adding data already available in ST while providing randomness for such added data. More precisely, we can hide the frequency information of a value x to be added by sampling a random ciphertext in the existing ciphertext range. For example, assume the client's state ST already holds five different ciphertexts for the encryption of k-gram x, that is:

$$\mathrm{Enc}^{FHOPE}(x) \in \{a, a+1, a+2, a+3, a+4\}.$$

The client chooses one of these values randomly as ciphertext of value x. One the one hand, more frequent k-grams have a bigger ciphertext-domain from which the encryption value is sampled. On the other hand, less frequent k-grams have a smaller ciphertext-domain but an encryption is needed less frequently for these k-grams since they occur less frequently. In conclusion, this random sampling has the effect of histogram flattening for k-grams.

A completely new k-gram $kg_n$ induces the re-encryption of all k-grams that are greater than $kg_n$ i.e., all k-grams $kg_i$ with $kg_i > kg_n$ need to be reencrypted. However, reencryption is an easy task for a DBMS: let us assume a new k-gram kg is added, and its OPE encryption is $Enc^{FHOPE}(kg)=x$. So all values with greater ciphertexts need a reencryption implemented by a simple SQL command, such as:

```
UPDATE CIPHERS SET ENC=ENC+1 WHERE
    ENC>x.
```

In order to minimize the necessity of this updating step, the client can reserve a bigger domain than needed for each value after indexing the initial database. For example, given a ciphertext domain for k-gram x as:

$$Enc^{FHOPE}(x) \in \{a, a+1, a+2, a+3, a+4\}$$

the client reserves an amount of b placeholding ciphertexts that are not used for the encryption of actual k-grams but added for later sampling.

That is, the ciphertext-domain $\{(a+4)+1, \ldots, (a+4)+b\}$ is added to the search index while the first ciphertext of the next real k-gram y is (a+4)+b+1. Since FHOPE encryption is applied to k-grams of a natural language, we can extract some statistics about x (or a prefix of x), e.g., in the case that k-gram x starts with the frequent letter 'e' we choose a bigger ciphertext gap b than in the case that x starts with the less frequent letter 'q'.

Alternatively, it is always possible to create a separate search index for each indexed document collection. That is, a first document collection m1 is indexed in a privacy-preserving index $ST_1$, $I_1 \leftarrow Enc(sk,m_1)$ and a second document collection is indexed afterwards in another privacy-preserving index $ST_2$, $I_2 \leftarrow Enc(sk,m_2)$. Now the client needs to query all different indexes separately, but we define a threshold t of different indexes. If t reached, all document collections $m_1, \ldots, m_t$ are merged to:

$$M=\cup_{i=1}^{t} m_i.$$

This merged document collection is then re-indexed to one fresh state and index $ST, I \leftarrow Enc(sk,M)$.

Additional measures providing possible increased security are now discussed. Although modular Order Preserving Encryption (OPE) has been suggested for deterministic order-preserving encryption, the same intuition can be applied to frequency-hiding order-preserving encryption.

There are two different approaches. One is that the ordering information over the alphabet are shifted with modular addition, e.g. the alphabet $\{a, \ldots, z\}$ starts with $\{o, \ldots, z, a, \ldots, n\}$.

Another approach is that the internal FHOPE range after building the index is shifted with a (secret) offset. This modular offset is then part of the secret state and increases the complexity of the bucketing attack.

Both approaches are viable in theory. However, the practical effect of the modular shift directly on the alphabet has a small security effect because there are only as much different shifts as the size of the alphabet.

An alternative approach with increased security levels enabling substring queries by our transformation from substrings to range queries, is based on functional encryption (e.g., privacy-preserving range queries). On the one hand, such constructions render the bucketing attack impossible, since no ordering information about the plaintext is leaked, but only the information if the plaintext falls within the queried range. On the other hand, the integration overhead of such solutions increase because the database internals require modifications and well-engineered indexing techniques are not applicable to such schemes (without additional leakage).

In conclusion, embodiments present a new approach for outsourcing encrypted data while providing substring search functionality with focus on the practical deployment. Our construction is based on k-gram indexing where each k-gram is encrypted using a static frequency-hiding order-preserving encryption scheme. We provide a theoretical security definition for this scheme, and have evaluated the practical security of this privacy-preserving outsourcing techniques.

That is, we attacked our construction with a strong attack on such encryption scheme, and report plaintext recovery rates between 1% and 15% based on the attacker's auxiliary knowledge about the indexed plaintext and the plaintext alphabet.

Compared to previous schemes allowing privacy-preserving substring search, embodiments are easy to deploy into existing database systems. In combination with a substring search time of 98.3 ms over 10,000 randomly chosen indexed e-mails of the Enron dataset, we present a scheme that can be deployed for practical use-cases.

It is noted that secure substring searching according to embodiments, may offer certain benefits over conventional approaches. In particular, such approaches require specially crafted encryption protocols to allow query execution on encrypted data. This in turn necessitates modification of the underlying database, since the search function has been altered. Such database modification further slows the actual search computation, and adds complexity and raises costs.

In an effort to minimize such computational slowdown, conventional approaches may resort to employing special privacy-preserving search indices. These contribute yet more complexity to the required database modifications.

By contrast, embodiments of secure substring search can be readily deployed without implicating modification in the underlying encrypted database. Rather, only transformation of the query on the client side is called for.

Figure 16:
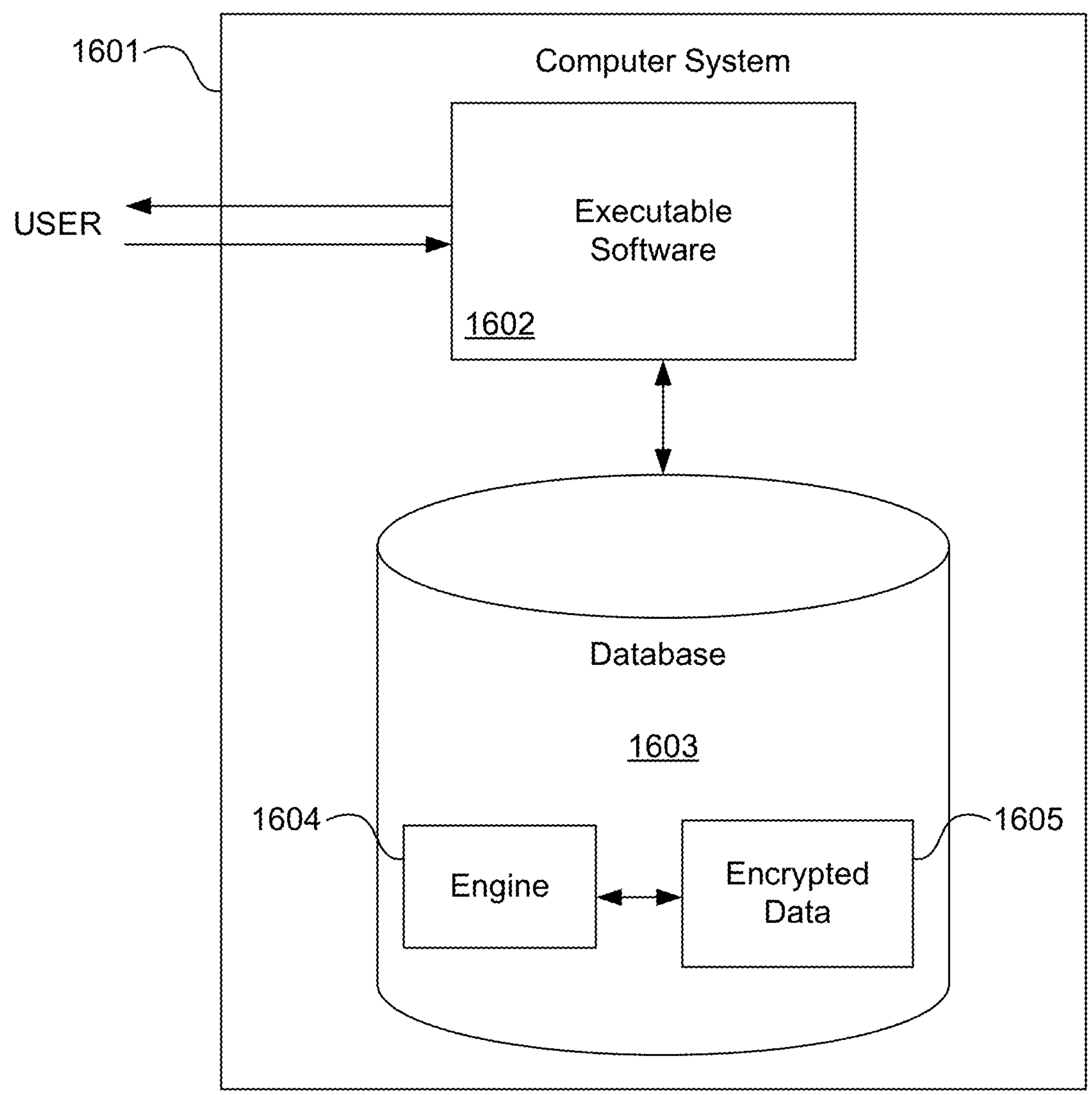
FIG. 16 illustrates hardware of a special purpose computing machine according to an embodiment that is configured to perform secure substring search.

Certain embodiments may be implemented in connection with an in-memory database, with the in-memory database engine performing one or more of secure substring search. FIG. 16 illustrates hardware of a special purpose computing machine configured to implement secure substring searching according to an embodiment. In particular, computer system 1601 comprises a processor 1602 that is in electronic communication with a non-transitory computer-readable storage medium comprising a database 1603. This computer-readable storage medium has stored thereon code 1605 corresponding to encrypted data. Code 1604 corresponds to an engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 17:
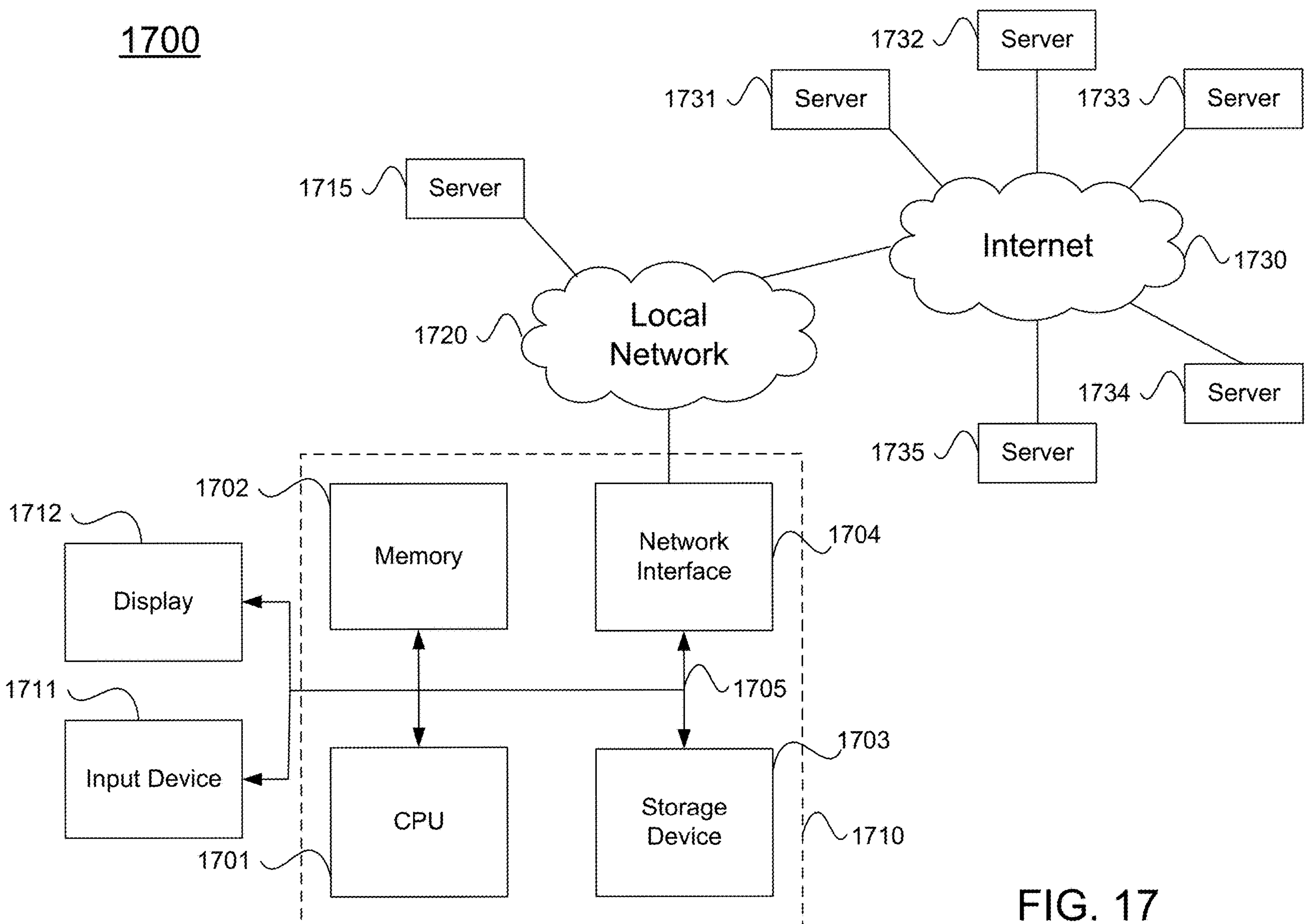
FIG. 17 illustrates an example computer system.

An example computer system 1700 is illustrated in FIG. 17. Computer system 1710 includes a bus 1705 or other communication mechanism for communicating information, and a processor 1701 coupled with bus 1705 for processing information. Computer system 1710 also includes a memory 1702 coupled to bus 1705 for storing information and instructions to be executed by processor 1701, including information and instructions for performing the techniques described above, for example. This memory may also be used for storing variables or other intermediate information during execution of instructions to be executed by processor 1701. Possible implementations of this memory may be, but are not limited to, random access memory (RAM), read only memory (ROM), or both. A storage device 1703 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1703 may include source code, binary code, or software files for performing the techniques above, for example. Storage device and memory are both examples of computer readable mediums.

Computer system 1710 may be coupled via bus 1705 to a display 1712, such as a cathode ray tube (CRT) or liquid crystal display (LCD), for displaying information to a computer user. An input device 1711 such as a keyboard and/or mouse is coupled to bus 1705 for communicating information and command selections from the user to processor 1701. The combination of these components allows the user to communicate with the system. In some systems, bus 1705 may be divided into multiple specialized buses.

Computer system 1710 also includes a network interface 1704 coupled with bus 1705. Network interface 1704 may provide two-way data communication between computer system 1710 and the local network 1720. The network interface 1704 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1704 sends and receives electrical, electromagnetic, or optical signals that carry digital data streams representing various types of information.

Computer system 1710 can send and receive information, including messages or other interface actions, through the network interface 1704 across a local network 1720, an Intranet, or the Internet 1730. For a local network, computer system 1710 may communicate with a plurality of other computer machines, such as server 1715. Accordingly, computer system 1710 and server computer systems represented by server 1715 may form a cloud computing network, which may be programmed with processes described herein. In the Internet example, software components or services may reside on multiple different computer systems 1710 or servers 1731-1735 across the network. The processes described above may be implemented on one or more servers, for example. A server 1731 may transmit actions or messages from one component, through Internet 1730, local network 1720, and network interface 1704 to a component on computer system 1710. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:

an engine of a server receiving from a trusted third party, a search index and a plurality of ciphertexts;

the engine storing the search index in a database;

the engine of the server receiving from a client, a search query;

the engine referencing the search index stored in the database of the server together with the plurality of ciphertexts, to produce candidate ciphertexts meeting the search query; and the engine communicating to the client at least one candidate ciphertext, wherein each of the plurality of ciphertexts comprise a fragment of a string encrypted according to an encryption scheme, and a position of the fragment within the string and wherein the fragment and the plurality of ciphertexts are generated from processing performed by the trusted third party as a dedicated service, the trusted third party being outside the server and the client.

2. A method as in claim 1 wherein the encryption scheme comprises an order-preserving encryption scheme.

3. A method as in claim 2 wherein the encryption scheme comprises a frequency-hiding order-preserving encryption (FHOPE) scheme.

4. A method as in claim 1 further comprising the engine filtering the candidate ciphertexts to produce the at least one candidate ciphertext.

5. A method as in claim 4 wherein the filtering comprises performing a range query.

6. A method as in claim 4 wherein the position is encrypted according to a deterministic encryption scheme.

7. A method as in claim 1 wherein the database comprises an in-memory database, and the engine comprises an in-memory database engine.

8. A method as in claim 1 further comprising:

prior to receiving the search query, the engine storing the search index outsourced from the client.

9. A non-transitory computer readable storage medium embodying a computer program for performing a method, said method comprising:

an engine of a server receiving from a trusted third party, a search index and a plurality of ciphertexts;

the engine storing the search index in a database;

the engine of the server receiving from a client, a search query;

the engine referencing the search index stored in the database of the server together with the plurality of ciphertexts encrypted according to a frequency-hiding order-preserving encryption (FHOPE) scheme, to produce candidate ciphertexts meeting the search query; and the engine communicating to the client at least one candidate ciphertext, wherein each of the plurality of ciphertexts comprise a fragment of a string encrypted according to an encryption scheme, and a position of the fragment within the string, and wherein the fragment and the plurality of ciphertexts are generated from processing performed by the trusted third party as a dedicated service, the trusted third party being outside the server and the client.

10. A non-transitory computer readable storage medium as in claim 9 wherein the method further comprises:

the engine filtering the candidate ciphertexts to produce the at least one candidate ciphertext.

11. A non-transitory computer readable storage medium as in claim 10 wherein the filtering comprises performing a range query.

12. A non-transitory computer readable storage medium as in claim 11 wherein the position is encrypted according to a deterministic encryption scheme.

13. A non-transitory computer readable storage medium as in claim 9 wherein the database comprises an in-memory database, and the engine comprises an in-memory database engine.

14. A computer system comprising:

one or more processors;

a software program, executable on said computer system, the software program configured to cause an in-memory database engine of a server to:

receive from a trusted third party, a search index and a plurality of ciphertexts;

store the search index in the in-memory database;

receive from a client, a search query;

reference the search index stored in the in-memory database of the server together with the plurality of ciphertexts, to produce candidate ciphertexts meeting the search query; and communicate to the client at least one candidate ciphertext, wherein each of the plurality of ciphertexts comprise a fragment of a string encrypted according to an encryption scheme, and a position of the fragment within the string and wherein the fragment and the plurality of ciphertexts are generated from processing performed by the trusted third party as a dedicated service, the trusted third party being outside the server and the client.

15. A computer system as in claim 14 wherein the encryption scheme comprises a frequency-hiding order-preserving encryption (FHOPE) scheme.

16. A computer system as in claim 14 wherein the software is further configured to cause the in-memory database engine to perform a filtering of the candidate ciphertexts to produce the at least one candidate ciphertext.

17. A computer system as in claim 16 wherein:

the filtering comprises performing a range query; and the position is encrypted according to a deterministic encryption scheme.

* * * * *